United States Patent
Mori et al.

(10) Patent No.: US 11,591,234 B2
(45) Date of Patent: Feb. 28, 2023

(54) MICROPARTICULATE HYDROTALCITE, METHOD FOR PRODUCING SAME, RESIN COMPOSITION OF SAME, AND SUSPENSION OF SAME

(71) Applicant: KYOWA CHEMICAL INDUSTRY CO., LTD., Kagawa (JP)

(72) Inventors: Kotaro Mori, Kagawa (JP); Shigeo Miyata, Kagawa (JP)

(73) Assignee: SETOLAS HOLDINGS, INC., Takamatsu (JP)

( * ) Notice: Subject to any disclaimer, the term of this patent is extended or adjusted under 35 U.S.C. 154(b) by 707 days.

(21) Appl. No.: 16/494,657

(22) PCT Filed: Mar. 15, 2018

(86) PCT No.: PCT/JP2018/010338
§ 371 (c)(1),
(2) Date: Sep. 16, 2019

(87) PCT Pub. No.: WO2018/169019
PCT Pub. Date: Sep. 20, 2018

(65) Prior Publication Data
US 2020/0017365 A1    Jan. 16, 2020

(30) Foreign Application Priority Data

Mar. 17, 2017 (JP) .............................. JP2017-053006
Nov. 7, 2017 (JP) .............................. JP2017-215084

(51) Int. Cl.
*C01F 7/00*    (2022.01)
*C08K 3/26*    (2006.01)
(Continued)

(52) U.S. Cl.
CPC ............... *C01F 7/785* (2022.01); *C08K 3/26* (2013.01); *C08K 9/02* (2013.01); *C08K 9/06* (2013.01);
(Continued)

(58) Field of Classification Search
None
See application file for complete search history.

(56) References Cited

U.S. PATENT DOCUMENTS 6,221,472 B1    4/2001    Nosu et al.
6,413,639 B1 *  7/2002    Kobayashi ............... C08K 9/06
                                                   428/407

(Continued)

FOREIGN PATENT DOCUMENTS

CN    105441484 A    3/2016
EP    0189899 A2    8/1986
(Continued)

OTHER PUBLICATIONS

International Search Report for PCT/JP2018/010338 and English Translation submitted herewith, dated Jun. 5, 2018 (4 pages).
(Continued)

*Primary Examiner* — Jun Li
(74) *Attorney, Agent, or Firm* — Fitch, Even, Tabin & Flannery LLP

(57) ABSTRACT

A hydrotalcite is represented by formula (1):

$$(M^{2+})_{1-x}(M^{3+})_x(OH)_2(A^{n-})_{x/n} \cdot mH_2O \quad (1),$$

wherein $M^{2+}$ indicates a divalent metal, $M^{3+}$ indicates a trivalent metal, $A^{n-}$ indicates an n-valent anion, n indicates an integer of 1 to 6, $0.17 \leq x \leq 0.36$, and $0 \leq m \leq 10$. The hydrotalcite has
(A) a lattice strain in the <003> direction is $3 \times 10^{-3}$ or less as measured using an X-ray diffraction method;
(Continued)

(B) primary particles with an average width between 5 nm and 200 nm inclusive per a SEM method; and (C) a degree of monodispersity of 50% or greater (degree of monodispersity (%)=(average width of primary particles as measured using the SEM method/average width of secondary particles as measured using a dynamic light scattering method)×100). A resin containing the hydrotalcite, a suspension containing the hydrotalcite and a method for producing the hydrotalcite are disclosed.

15 Claims, 4 Drawing Sheets

(51) Int. Cl.
| | |
|---|---|
| C08K 9/02 | (2006.01) |
| C08K 9/06 | (2006.01) |
| C08L 27/06 | (2006.01) |
| C01F 7/785 | (2022.01) |
| B82Y 30/00 | (2011.01) |
| B82Y 40/00 | (2011.01) |

(52) U.S. Cl.
CPC ............... *C08L 27/06* (2013.01); *B82Y 30/00* (2013.01); *B82Y 40/00* (2013.01); *C01P 2002/22* (2013.01); *C01P 2002/70* (2013.01); *C01P 2004/03* (2013.01); *C01P 2004/60* (2013.01); *C08K 2003/267* (2013.01)

(56) References Cited

U.S. PATENT DOCUMENTS

| 11,078,087 B2* | 8/2021 | Kawahito | C08K 3/22 |
|---|---|---|---|
| 2007/0106002 A1* | 5/2007 | Tsujimoto | C08K 3/26 |
| | | | 524/437 |
| 2007/0185251 A1* | 8/2007 | Kobayashi | C01F 7/785 |
| | | | 428/403 |
| 2010/0123101 A1 | 5/2010 | Ono | |
| 2015/0010652 A1 | 1/2015 | Kurogi et al. | |
| 2015/0037237 A1 | 2/2015 | Nakamura et al. | |

FOREIGN PATENT DOCUMENTS

| EP | 2546296 A1 | 1/2013 | |
|---|---|---|---|
| EP | 2832697 A1 | 2/2015 | |
| JP | 11-255973 A | 9/1999 | |
| JP | 2005-088540 A | 4/2005 | |
| JP | 2005-089277 A | 4/2005 | |
| JP | 2011-174043 A | 9/2011 | |
| JP | 2013-212937 A | 10/2013 | |
| WO | WO-9605140 A1 * | 2/1996 | ............ B01J 23/007 |
| WO | 2008/136272 A1 | 11/2008 | |
| WO | WO-2011107667 A1 * | 9/2011 | ............ B01J 23/007 |
| WO | 2011155787 A2 | 12/2011 | |
| WO | 2013/147284 A1 | 10/2013 | |
| WO | 2013/147285 A1 | 10/2013 | |

OTHER PUBLICATIONS

Written Opinion of the International Searching Authority, dated Jun. 5, 2018 (3 pages).

* cited by examiner

[Fig. 1]
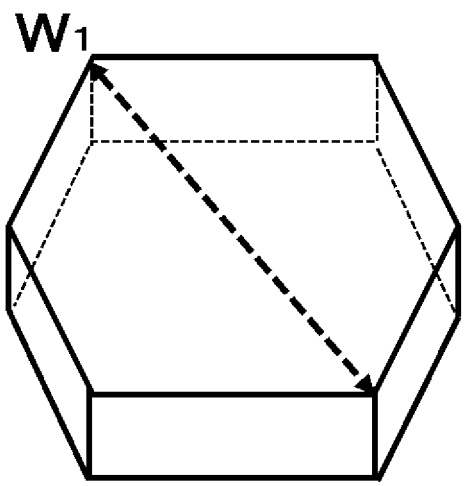
Width (W1) of primary particle
[Fig. 2]
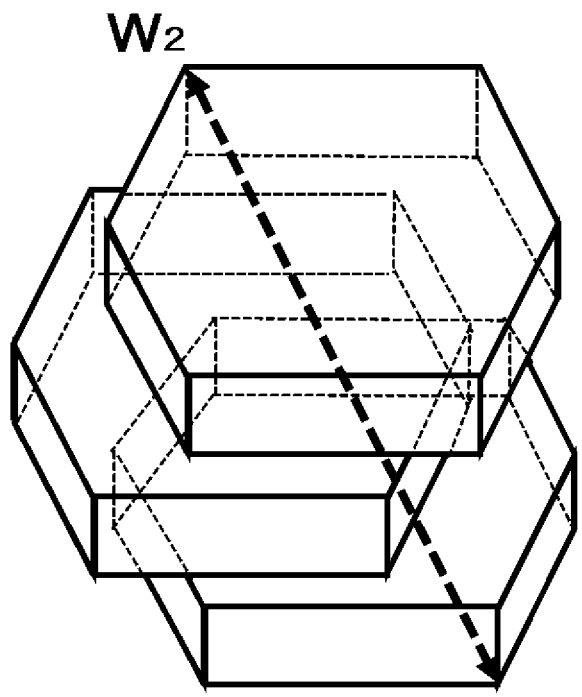
Width (W2) of secondary particle

[Fig. 3]
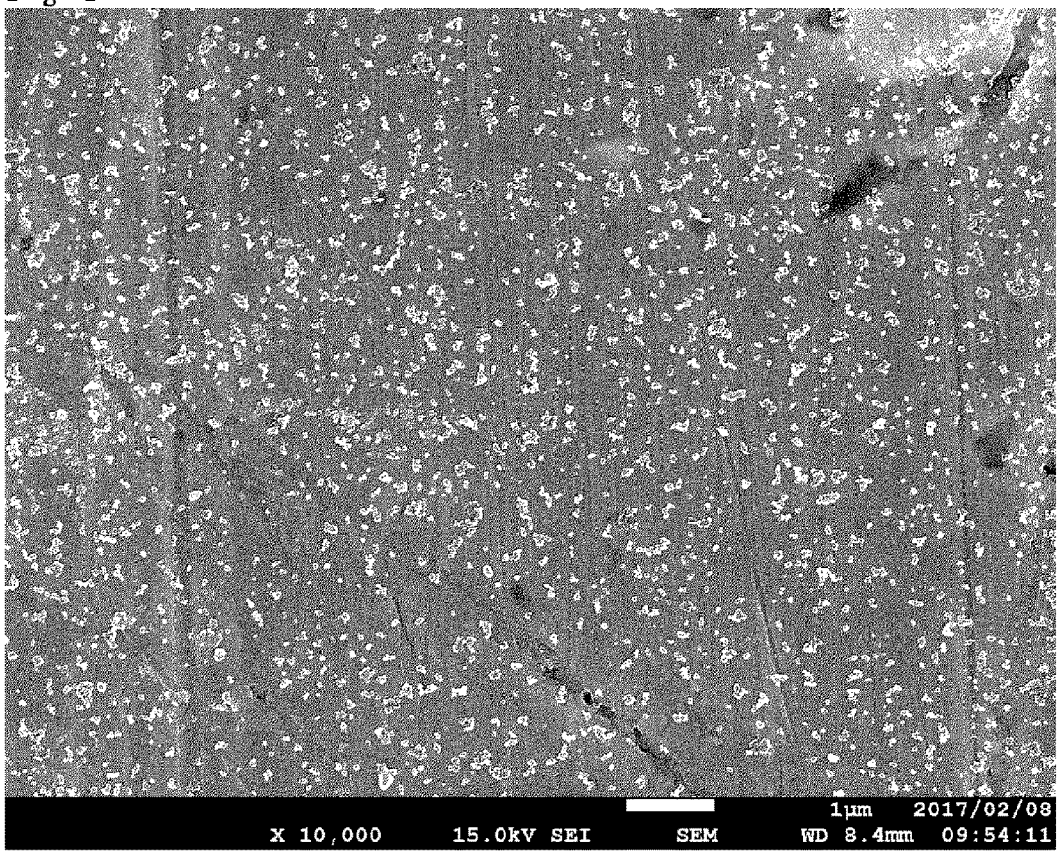
[Fig. 4]
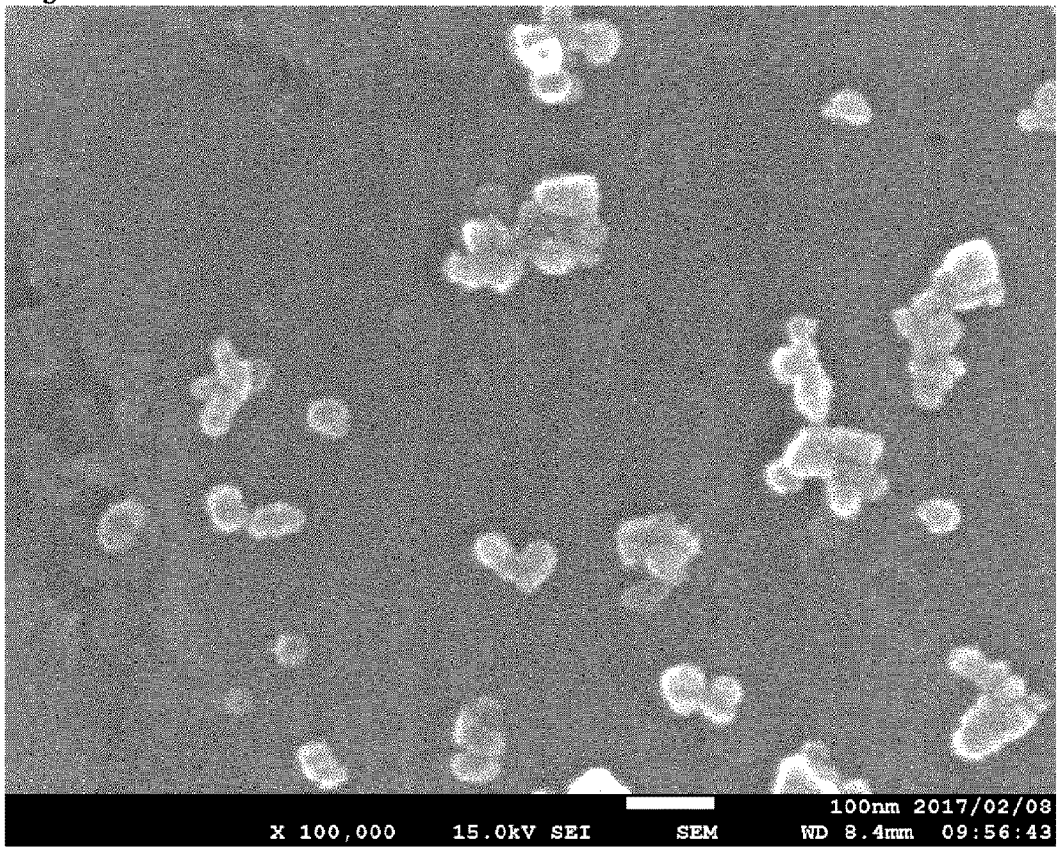

[Fig. 5]
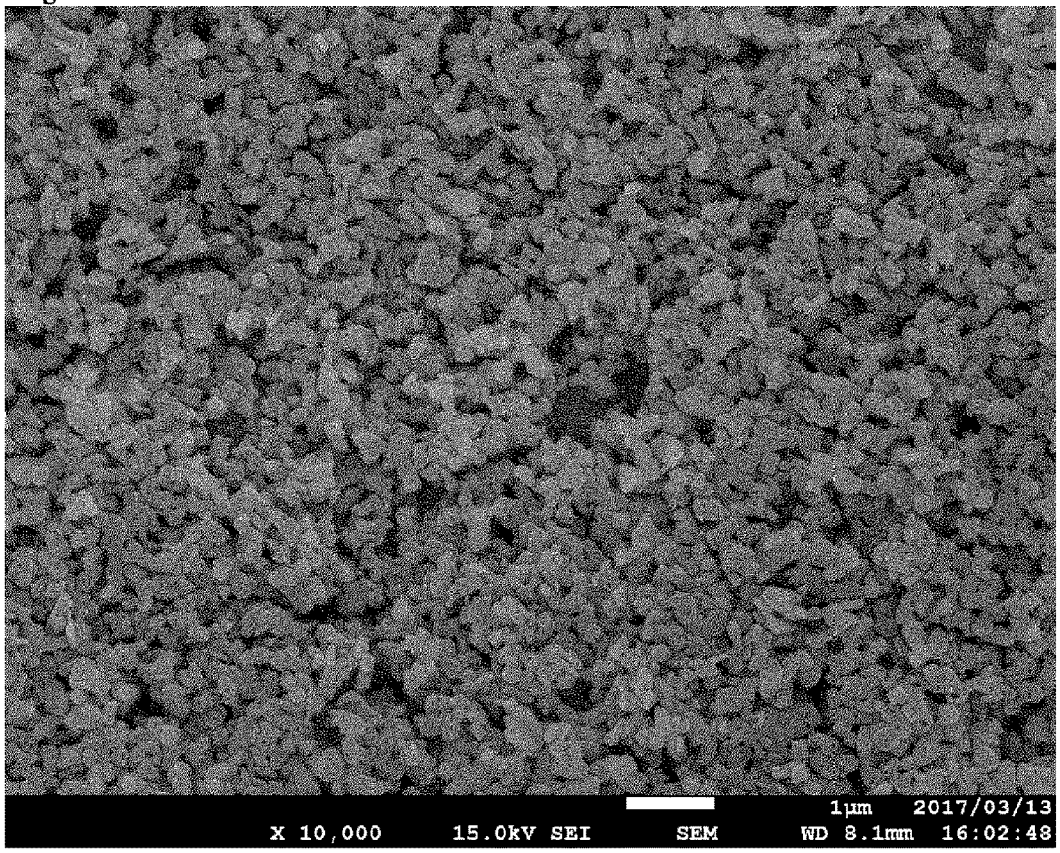
[Fig. 6]
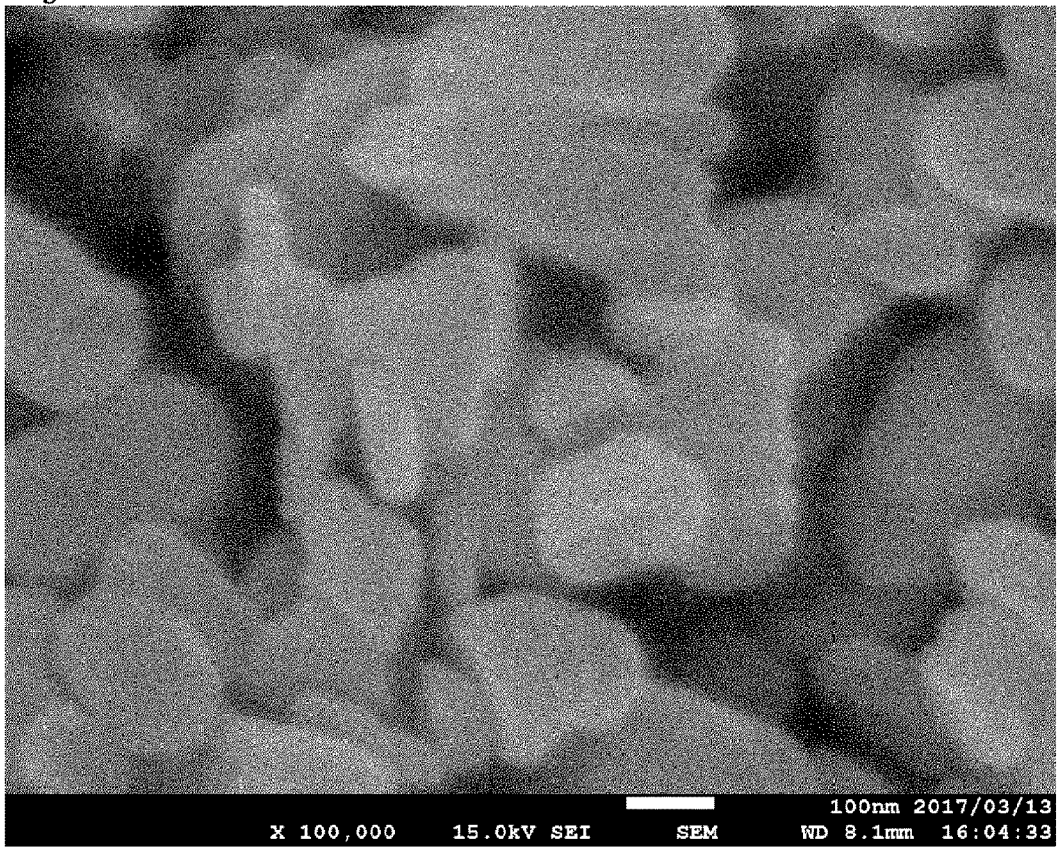

[Fig. 7]
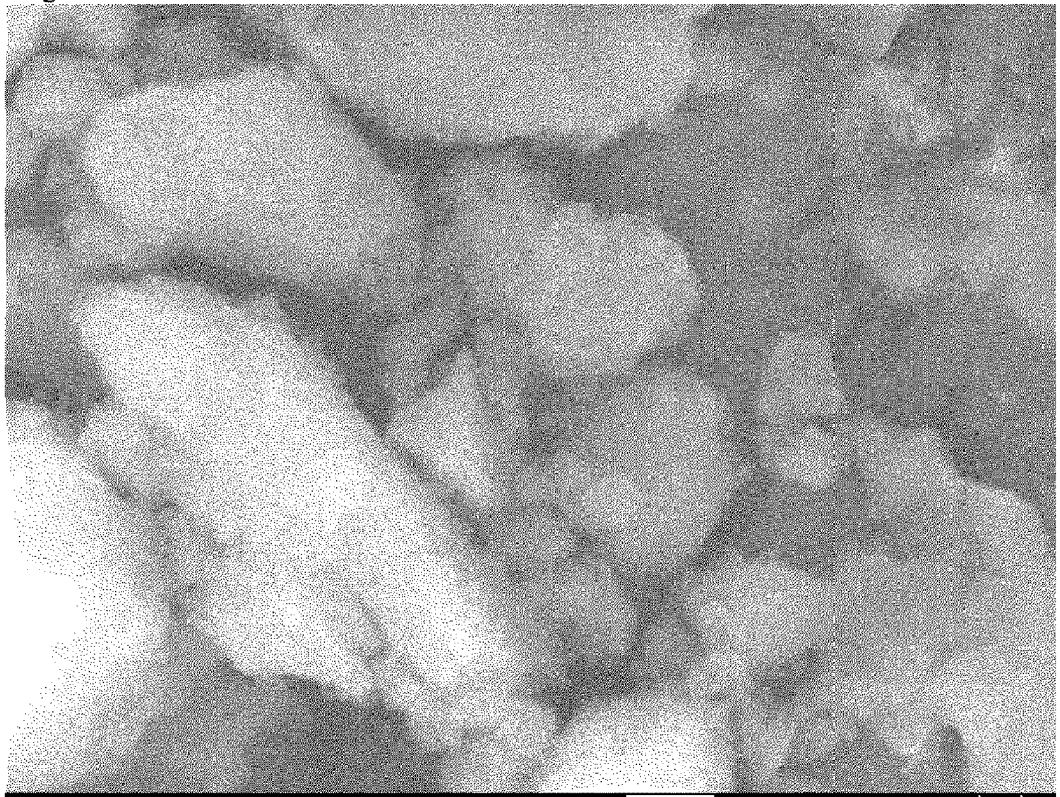
[Fig. 8]
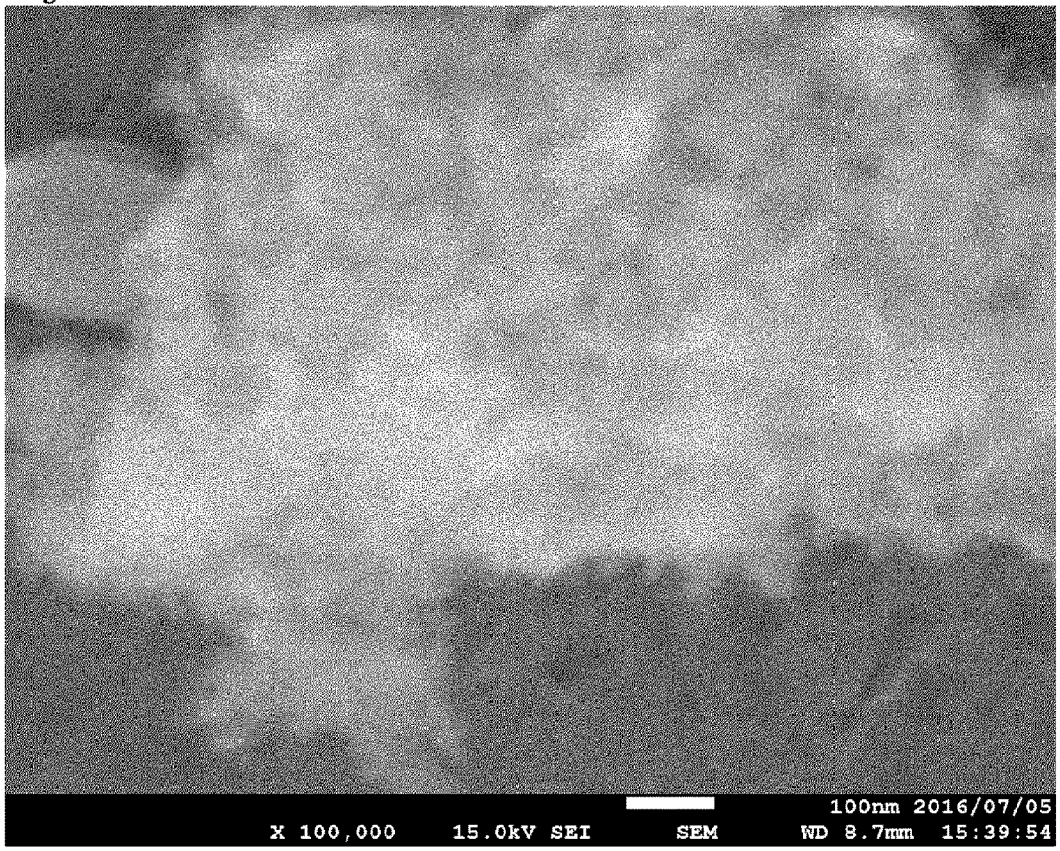

MICROPARTICULATE HYDROTALCITE, METHOD FOR PRODUCING SAME, RESIN COMPOSITION OF SAME, AND SUSPENSION OF SAME

CROSS-REFERENCE TO RELATED APPLICATIONS

This application is a U.S. national phase application filed under 35 U.S.C. § 371 of International Application No. PCT/JP2018/010338, filed Mar. 15, 2018, designating the United States, which claims priority from Japanese Patent Application No. 2017-053006, filed Mar. 17, 2017, Japanese Patent Application No. 2017-215084, filed Nov. 7, 2017, the complete disclosures of all the applications are hereby incorporated herein by reference in their entirety.

TECHNICAL FIELD

The present invention relates to a hydrotalcite which has a different X-ray diffraction structure than a conventional hydrotalcite and in which primary particles have a small average width and few primary particles are aggregated, a method for producing the same, a resin composition of the same, and a suspension of the same.

BACKGROUND ART

A hydrotalcite can be synthesized using a coprecipitation method. Primary particles of a hydrotalcite that can be obtained using the coprecipitation method are minute crystals with an average width of several tens of nanometers, but there is a problem in that these primary particles are strongly aggregated, and secondary particles are as large as several micrometers to several tens of micrometers.

To address this issue, various hydrotalcites have been developed in which the average width of primary particles is as small as 200 nm or less and few primary particles are aggregated. However, all of the developed methods have a problem in that primary particles are dispersed immediately after the reaction, but during long-term storage as a suspension, primary particles gradually aggregate, resulting in sedimentation. Moreover, there is another problem in that primary particles aggregate when the suspension is dehydrated and dried to a powder.

Patent Document 1 states that a hydrotalcite having an average secondary particle diameter of 5 nm to 100 nm was obtained by performing wet grinding after the coprecipitation reaction. In Example 2 thereof, there is a description to the effect that the average secondary particle diameter in a suspension immediately after wet grinding was 62 nm, and the average secondary particle diameter in the suspension after being allowed to stand for one day was 68 nm. However, when the inventors of the present invention conducted a replication study, the average secondary particle diameter after the post-reaction suspension was allowed to stand for 10 days measured 600 nm, and aggregation of primary particles occurred. Also, a problem arose in that, as a result of the aggregation of primary particles, sedimentation of secondary particles occurred. Furthermore, when the suspension immediately after the reaction of Example 2 was dehydrated and vacuum-dried to a powder, the average secondary particle diameter was 4.5 μm, the BET specific surface area was as low as 3.5 $m^2/g$, and aggregation of primary particles was confirmed in SEM observation.

Patent Document 2 states that a hydrotalcite having an average secondary particle diameter of 1 to 100 nm was obtained by using a microreactor as a reactor. However, when the inventors of the present invention conducted a replication study with respect to Example 1 thereof, the average secondary particle diameter in the suspension immediately after the reaction was about 30 nm, but the average secondary particle diameter after the suspension was allowed to stand for 10 days was 800 nm. Moreover, aggregation of primary particles also occurred. Also, a problem arose in that, as a result of the aggregation of primary particles, the hydrotalcite settled as a sediment. Furthermore, when the suspension immediately after the reaction of Example 1 was dehydrated and vacuum-dried, the average secondary particle diameter of the resulting powder was 3.8 μm, the BET specific surface area thereof was as low as 4.2 $m^2/g$, and aggregation of primary particles was confirmed in SEM observation.

Patent Document 3 states that a colloidal hydrotalcite dispersion was obtained by synthesizing a hydrotalcite in which lactic acid was inserted between layers, washing the hydrotalcite with water, suspending the hydrotalcite in water, aging the suspension, and causing delamination. In Example 1 thereof, there is a description to the effect that a semitransparent colloidal solution in which a hydrotalcite nanosheet served as a dispersoid was obtained by using magnesium lactate, aluminum lactate, lactic acid, and caustic soda as raw materials, washing with water a reaction product obtained through precipitation, then suspending the reaction product in water, and allowing the resulting suspension to stand for several days. However, the reason that lactic acid is used for the reaction in Patent Document 3 is to delaminate the hydrotalcite, and differs from an object of the present application, which is to improve the dispersibility of primary particles and reduce the particle size. A replication study of Example 1 was conducted, and when the obtained colloidal solution was dehydrated and dried, and the resulting powder was analyzed, aggregation of primary particles was confirmed in SEM observation. Furthermore, Patent Document 3 makes no mention of the particle diameter, crystal strain, dispersibility, and suspension stability of hydrotalcite particles, and it was not indicated that the requirements for a hydrotalcite with respect to which the present application seeks for protection were satisfied.

There has been demand for a hydrotalcite that, when used as a suspension, has suspension stability so that, even during long-term storage, primary particles do not aggregate, and sedimentation does not occur. Furthermore, there has been demand for a hydrotalcite in which, when the hydrotalcite is used as a powder as well, primary particles do not aggregate and are close to being monodisperse. However, with conventional methods, no hydrotalcite that satisfies these requirements was obtained.

CITATION LIST

Patent Documents

Patent Document 1: WO 2013/147284
Patent Document 2: WO 2013/147285
Patent Document 3: JP 2011-174043A

SUMMARY OF INVENTION

Technical Problem

An object of the present invention is to overcome the following problems with related art that arise when the primary particle diameter of a hydrotalcite is reduced (e.g., a hydrotalcite in which primary particles are minute): (1) aggregation of primary particles that occurs during long-term storage of the hydrotalcite as a suspension, and (2) aggregation of primary particles that occurs when the suspension is dehydrated and dried to a powder.

As a result of in-depth research, the inventors of the present invention ascertained that these two problems are caused by crystallite lattice strain in a hydrotalcite. In a hydrotalcite with a small primary particle diameter that was produced by using a conventional method, the lattice strain was large, and the lattice strain in the <003> direction as measured using an X-ray diffraction method was at least $4\times10^{-3}$. If the lattice strain is large, primary particles are likely to aggregate when the hydrotalcite is stored as a suspension for a long period of time or reduced to a powder. Therefore, the inventors of the present invention found that a hydrotalcite in which the primary particle diameter is small and the crystal strain is small can be produced by conducting a reaction under specific conditions and, furthermore, performing aging, and thus the present invention was achieved.

Solution to Problem

The present invention provides a hydrotalcite that overcomes the above-described problems, the hydrotalcite being represented by a formula (1) below:

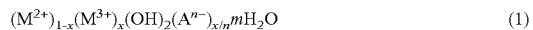

$$(M^{2+})_{1-x}(M^{3+})_x(OH)_2(A^{n-})_{x/n}\cdot mH_2O \qquad (1)$$

where $M^{2+}$ indicates at least one divalent metal, $M^{3+}$ indicates at least one trivalent metal, $A^{n-}$ indicates an n-valent anion, n indicates an integer of 1 to 6, and x and m are within respective ranges of $0.17 \leq x \leq 0.36$ and $0 \leq m \leq 10$, the hydrotalcite satisfying (A) to (C) below:

(A) the lattice strain in the <003> direction as measured using an X-ray diffraction method is $3\times10^{-3}$ or less;

(B) the average width of primary particles as measured using a SEM method is between 5 nm and 200 nm inclusive; and (C) the degree of monodispersity expressed by an equation below is 50% or greater:

degree of monodispersity (%)=(average width of primary particles as measured using the SEM method/average width of secondary particles as measured using a dynamic light scattering method)×100.

A method for producing a hydrotalcite of the present invention includes the following four steps.

(1) A raw material preparation step of preparing an aqueous solution of a water-soluble composite metal salt and an aqueous solution of an alkali metal hydroxide, the aqueous solution of the water-soluble composite metal salt containing a salt of a divalent metal, a salt of a trivalent metal, and a monovalent organic acid and/or organic acid salt that forms a complex with the trivalent metal.

(2) A reaction step of causing the aqueous solution of the water-soluble composite metal salt and the aqueous solution of the alkali metal hydroxide prepared in the step (1) to continuously react with each other at a reaction temperature of 0 to 60° C. and a reaction pH of 8.5 to 11.5 to thereby obtain a suspension containing a hydrotalcite.

(3) A washing step of dehydrating the suspension containing the hydrotalcite obtained in the step (2), and then performing washing with water and suspending in water and/or an organic solvent.

(4) An aging step of stirring and retaining a suspension containing the washed hydrotalcite obtained in the step (3) at 0 to 100° C. for 1 to 60 hours.

The lattice strain in the hydrotalcite can be reduced, and thus aggregation of primary particles can be prevented, by adding, as a complexing agent, the monovalent organic acid and/or organic acid salt that forms a complex with the trivalent metal during the reaction, and increasing the precipitation pH of the trivalent metal as a hydroxide to a value closer to the precipitation pH of the divalent metal. Furthermore, due to the steric hindrance effect of molecules of the complexing agent, the complexing agent also has an effect of suppressing crystal growth of primary particles of the hydrotalcite during the reaction. In the aging step, the dispersibility of primary particles can be increased even more by stirring and retaining, at 0 to 100° C. for 1 to 60 hours, the suspension containing the hydrotalcite after being washed with water after the reaction.

Advantageous Effects of Invention

The hydrotalcite of the present invention can be used for various uses including a thermal stabilizer for a polyvinyl chloride resin, a neutralizing agent for a residue of a polyolefin polymerization catalyst, an acid acceptor for a halogen-containing rubber, a heat-insulating agent for an agricultural film, and the like. In particular, a suspension that contains the hydrotalcite can be favorably used as a liquid antacid or thermal stabilizer. The hydrotalcite of the present invention has a significantly improved anion-exchangeability compared with conventional hydrotalcites, and therefore exhibits superior effects as a stabilizer, a neutralizing agent, and an acid acceptor to a conventional hydrotalcite if added in the same amount, and can exhibit equivalent performance to that of a conventional hydrotalcite even if added in a smaller amount than the conventional hydrotalcite. Moreover, when the hydrotalcite of the present invention is added to a resin, higher transparency is obtained compared with when a conventional hydrotalcite is added in the same amount.

BRIEF DESCRIPTION OF DRAWINGS

FIG. 1 is a schematic diagram for explaining the width of a primary particle of a hydrotalcite of the present invention.

FIG. 2 is a schematic diagram for explaining the width of a secondary particle of the hydrotalcite of the present invention.

FIG. 3 sa SEM micrograph at a magnification of 10,000 of a hydrotalcite of a sample 4 of Example 4.

FIG. 4 is a SEM micrograph at a magnification of 100,000 of the hydrotalcite of the sample 4 of Example 4.

FIG. 5 is a SEM micrograph at a magnification of 10,000 of a hydrotalcite of a sample 15 of Comparative Example 2.

FIG. 6 is a SEM micrograph at a magnification of 100,000 of the hydrotalcite of the sample 15 of Comparative Example 2.

FIG. 7 is a SEM micrograph at a magnification of 10,000 of a hydrotalcite of a sample 19 of Comparative Example 6.

FIG. 8 is a SEM micrograph at a magnification of 100,000 of the hydrotalcite of the sample 19 of Comparative Example 6.

DESCRIPTION OF EMBODIMENTS

Hereinafter, the present invention will be described in detail.

<Hydrotalcite>

With respect to a hydrotalcite of the present invention, the chemical formula, the types of metals, the range of x (abundance ratio between a divalent metal and a trivalent metal), the range of m, the type of an interlayer anion, the lattice strain in the <003> direction, the average width of primary particles, the degree of monodispersity, the BET specific surface area, and the surface treatment are as follows.

(Chemical Formula)

The hydrotalcite of the present invention is represented by a formula (1) below:

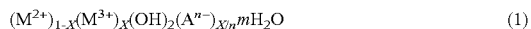

$$(M^{2+})_{1-x}(M^{3+})_x(OH)_2(A^{n-})_{x/n} \cdot mH_2O \qquad (1)$$

where $M^{2+}$ indicates at least one divalent metal, $M^{3+}$ indicates at least one trivalent metal, $A^{n-}$ indicates an n-valent anion, n indicates an integer of 1 to 6, and x and m are within respective ranges of $0.17 \leq x \leq 0.36$ and $0 \leq m \leq 10$.

(Types of Metals)

In the hydrotalcite represented by the formula (1), $M^{2+}$ indicates at least one divalent metal, and $M^{3+}$ indicates at least one trivalent metal. A preferred divalent metal is at least one selected from the group consisting of Mg and Zn, and a preferred trivalent metal is Al. The reason for this is that these metals are very safe to living organisms and also have a wide variety of uses because particles thereof are white.

(Range of x)

In the hydrotalcite represented by the formula (1), the range of x is $0.17 \leq x \leq 0.36$, and preferably $0.19 \leq x \leq 0.34$. If x is more than 0.36, boehmite is formed as a by-product. Conversely, if x is less than 0.17, magnesium hydroxide is formed as a by-product. Both of these by-products cause a decrease in transparency when the hydrotalcite is added to a resin.

(Range of m)

In the hydrotalcite represented by the formula (1), the range of m is $0 \leq m \leq 10$, and preferably $0 \leq m \leq 6$.

When the temperature of a hydrotalcite is gradually increased, elimination of water of crystallization occurs at a temperature close to about 180 to 230° C. Therefore, in uses in which the hydrotalcite is added to a synthetic resin, if the treatment temperature during kneading (or cross-linking) is 200° C. or more, it is preferable that the range of m is $0 \leq m \leq 0.05$. The reason for this is that, when m is within this range, problems, such as foaming and silver streaks of the resin, due to the elimination of water of crystallization can be prevented.

(Type of Interlayer Anion)

In the hydrotalcite represented by the formula (1), $A^{n-}$ indicates an n-valent anion, and n indicates an integer of 1 to 6, and $A^{n-}$ is preferably at least one selected from $CO_3^{2-}$ and $ClO_4^-$.

(Lattice Strain in the <003> Direction)

In the hydrotalcite of the present invention, the lattice strain in the <003> direction as measured using an X-ray diffraction method is $3 \times 10^{-3}$ or less, preferably $2.5 \times 10^{-3}$ or less, and more preferably $2 \times 10^{-3}$ or less. If the lattice strain in the <003> direction is larger than $3 \times 10^{-3}$, primary particles are likely to aggregate when the hydrotalcite is reduced to a powder or stored as a suspension for a long period of time.

(Definition of Primary Particle)

A primary particle is a particle that has a clear boundary and cannot be geometrically divided any further. FIG. 1 is a schematic diagram for explaining the width ($W_1$) of a primary particle that is used in the present invention. The width $W_1$ of the primary particle is defined as shown in FIG. 1. That is to say, assuming that the primary particle has a hexagonal plate-shaped surface, the major diameter of the particle is the "width $W_1$ of the primary particle".

(Definition of Secondary Particle)

A secondary particle is a particle that is an aggregate formed of a collection of a plurality of primary particles. FIG. 2 is a schematic diagram for explaining a secondary particle that is used in the present invention and the width ($W_2$) of the secondary particle. The width $W_2$ of the secondary particle is defined as shown in FIG. 2. That is to say, assuming that the secondary particle is enclosed in a sphere, the diameter of the sphere is the "width $W_2$ of the secondary particle".

(Average Width of Primary Particles)

In the hydrotalcite of the present invention, the average width of primary particles as measured using a SEM method is between 5 nm and 200 nm inclusive, preferably between 5 nm and 150 nm inclusive, more preferably between 5 nm and 100 nm inclusive, even more preferably between 5 nm and 80 nm inclusive, yet more preferably between 5 nm and 60 nm inclusive, and most preferably between 5 nm and 50 nm inclusive. The average width of primary particles is obtained from an arithmetic mean of measured values of the width of any 100 crystals in a SEM micrograph, using the SEM method. In principle, the width of primary particles cannot be measured using a laser diffraction method. Therefore, the width of primary particles is visually observed using the SEM method.

(Degree of Monodispersity)

In the hydrotalcite of the present invention, the degree of monodispersity expressed by the equation below is 50% or greater, and preferably 80% or greater. The width of secondary particles is measured using a dynamic light scattering method, because it is difficult to accurately measure the width of secondary particles using a SEM method.

Degree of monodispersity (%)=(average width of primary particles as measured using SEM method/average width of secondary particles as measured using dynamic light scattering method)×100

(BET Specific Surface Area)

In the hydrotalcite of the present invention, the BET specific surface area is 20 to 600 m²/g, preferably 30 to 500 m²/g, and more preferably 40 to 400 m²/g. If the BET specific surface area is less than 20 m²/g, dispersion of primary particles in a powder state is insufficient. If the BET specific surface area is more than 600 m²/g, the powder is bulky, and therefore the ease of handling when, for example, kneading the hydrotalcite together with a synthetic resin is poor.

(Surface Treatment)

In the hydrotalcite of the present invention, in order to improve the dispersibility in a resin, it is desirable that particles are surface-treated. Examples of a surface treatment agent include, but are not limited to, an anionic surfactant, a cationic surfactant, a phosphate ester treatment agent, a silane coupling agent, a titanate coupling agent, an aluminum coupling agent, a silicone-based treatment agent, silicic acid, water glass, and the like. The surface treatment agent is particularly preferably at least one selected from the group consisting of oleic acid, stearic acid, octanoic acid, and octylic acid. The amount of surface treatment agent is 0.01 to 20 wt %, and preferably 0.1 to 15 wt %, with respect to the weight of the hydrotalcite.

<Resin Composition>

A resin composition of the present invention contains the hydrotalcite of the present invention in an amount of 0.1 to 250 parts by weight with respect to 100 parts by weight of a resin. The amount of the hydrotalcite that is added is more preferably 1 to 200 parts by weight with respect to 100 parts by weight of the resin.

There is no particular limitation on the method for mixing and kneading the resin and the hydrotalcite of the present invention, but a method that enables uniform mixing of the two components is preferable. For example, the mixing and kneading are performed using a single- or twin-screw extruder, a roller, a Banbury mixer, or the like. There also is no particular limitation on the molding method, and a known molding means can be employed as desired, depending on the types of resin and rubber, the type of the desired molded product, and the like. For example, injection molding, extrusion molding, blow molding, press molding, rotational molding, calender molding, sheet forming molding, transfer molding, laminate molding, vacuum forming, and the like can be employed.

The resin that is used in the present invention means a resin and/or a rubber, and examples thereof include halogen-containing resins such as polyvinyl chloride, polyvinyl bromide, polyvinyl fluoride, polyvinylidene chloride, chlorinated polyethylene, chlorinated polypropylene, brominated polyethylene, chlorinated rubber, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-acrylonitrile copolymer, a vinyl chloride-butadiene copolymer, a vinyl chloride-chlorinated propylene copolymer, a vinyl chloride-vinylidene chloride-vinyl acetate ternary copolymer, a vinyl chloride-maleic acid ester copolymer, a vinyl chloride-methacrylic acid copolymer, a vinyl chloride-methacrylic acid ester copolymer, a vinyl chloride-acrylonitrile copolymer, an internally plasticized polyvinyl chloride, and the like. Also, the examples of the resin include thermoplastic resins such as polyethylene, a copolymer of ethylene and another α-olefin, a copolymer of ethylene and vinyl acetate, a copolymer of ethylene and an acrylic acid ether, a copolymer of ethylene and methyl acrylate, polypropylene, a copolymer of propylene and another α-olefin, polybutene-1, poly 4-methylpentene-1, polystyrene, a copolymer of styrene and acrylonitrile, a copolymer of ethylene and a propylene diene rubber, a copolymer of ethylene and butadiene, polyvinyl acetate, polylactic acid, polyvinyl alcohol, polyacrylate, polymethacrylate, polyurethane, polyester, polyether, polyamide, ABS, polycarbonate, polyphenylene sulfide, and the like. Moreover, the examples of the resin include thermosetting resins such as a phenolic resin, a melamine resin, an epoxy resin, an unsaturated polyester resin, an alkyd resin, and the like. Furthermore, the examples of the resin include EPDM, SBR, NBR, butyl rubber, chloroprene rubber, isoprene rubber, chlorosulfonated polyethylene rubber, silicone rubber, fluororubber, chlorinated butyl rubber, brominated butyl rubber, epichlorohydrin rubber, and the like.

In addition to the hydrotalcite, other additives, for example, an antioxidant, a reinforcing agent such as talc, an ultraviolet absorber, a lubricant, a flatting agent such as microparticulate silica, a pigment such as carbon black, a flame retardant such as a bromine-based flame retardant or a phosphate ester-based flame retardant, and the like can be appropriately selected and added to the resin composition of the present invention. Moreover, a flame-retarding assistant, such as zinc stannate, alkali metal stannate, or a carbon powder, and a filling agent such as calcium carbonate can be appropriately selected and added. With respect to 100 parts by weight of the resin, preferred amounts of these additives are 0.01 to 5 parts by weight for an antioxidant, 0.1 to 50 parts by weight for a reinforcing agent, 0.01 to 5 parts by weight for an ultraviolet absorber, 0.1 to 5 parts by weight for a lubricant, 0.01 to 5 parts by weight for a flatting agent, 0.01 to 5 parts by weight for a pigment, 0.1 to 50 parts by weight for a flame retardant, 0.01 to 10 parts by weight for a flame-retarding assistant, and 1 to 50 parts by weight for a filling agent.

<Molded Product>

The present invention encompasses a molded product formed of the above-described resin composition.

<Suspension>

In a suspension of the present invention, the solvent is water and/or an organic solvent, and the concentration of the hydrotalcite is 0.1 to 300 g/L. The concentration of the hydrotalcite is preferably 0.5 to 250 g/L, and more preferably 1 to 200 g/L.

Examples of the organic solvent that is used in the present invention include, but are not limited to, benzene, toluene, xylene, normal hexane, isohexane, normal heptane, cyclohexane, methylcyclohexane, ethylcyclohexane, methanol, ethanol, normal propyl alcohol, isopropyl alcohol, normal butanol, isobutanol, octanol, monoethylene glycol, diethylene glycol, triethylene glycol, propylene glycol, ethyl acetate, butyl acetate, isobutyl acetate, amyl acetate, methyl acetate, propylene glycol monomethyl ether acetate, methyl ethyl ketone, acetone, methyl isobutyl ketone, diisobutyl ketone, cyclohexanone, isophorone, diacetone alcohol, ethylene glycol monomethyl ether, ethylene glycol monoethyl ether, ethylene glycol monobutyl ether, diethylene glycol monoethyl ether, diethylene glycol monobutyl ether, diethylene glycol monomethyl ether, propylene glycol monomethyl ether, isopropyl ether, dichloromethane, trichloroethylene, perchloroethylene, tetrahydrofuran, N,N-dimethylformamide, dimethyl sulfoxide, N-methyl-2-pyrrolidone, gamma-butyrolactone, dioctyl phthalate, diisononyl phthalate, diisodecyl phthalate, dibutyl phthalate, dioctyl adipate, diisononyl adipate, trioctyl trimellitate, tricresyl phosphate, acetyl tributyl citrate, epoxidized soybean oil, epoxidized linseed oil, a sebacic acid ester, an azelaic acid ester, a maleic acid ester, a benzoic acid ester, and the like.

<Method for Producing Hydrotalcite>

A method for producing a hydrotalcite of the present invention includes the following four steps.

(1) A raw material preparation step of preparing an aqueous solution of a water-soluble composite metal salt and an aqueous solution of an alkali metal hydroxide, the aqueous solution of a water-soluble composite metal salt containing a salt of a divalent metal, a salt of a trivalent metal, and a monovalent organic acid and/or organic acid salt that forms a complex with the trivalent metal.

(2) A reaction step of causing the aqueous solution of the water-soluble composite metal salt and the aqueous solution of the alkali metal hydroxide prepared in the step (1) to continuously react with each other at a reaction temperature of 0 to 60° C. and a reaction pH of 8.5 to 11.5 to thereby obtain a suspension containing a hydrotalcite.

(3) A washing step of dehydrating the suspension containing the hydrotalcite obtained in the step (2), and then performing washing with water and suspending in water and/or an organic solvent.

(4) An aging step of stirring and retaining a suspension containing the washed hydrotalcite obtained in the step (3) at 0 to 100° C. for 1 to 60 hours.

(Raw Material Preparation Step)

Raw materials for the hydrotalcite of the present invention are a salt of a divalent metal, a salt of a trivalent metal, a monovalent organic acid and/or organic acid salt that forms a complex with the trivalent metal, and an alkali metal hydroxide salt. Examples of the divalent metal salt include, but are not limited to, water-soluble divalent metal salts, such as magnesium chloride, magnesium bromide, magnesium nitrate, magnesium acetate, zinc chloride, zinc bromide, zinc nitrate, zinc acetate, and the like. In order to prevent aggregation of primary particles, preferably, a divalent metal salt containing a monovalent anion is used. A combination of two or more divalent metal salts can also be used. Preferably, magnesium chloride and/or zinc chloride is used. Examples of the trivalent metal salt include, but are not limited to, water-soluble trivalent metal salts, such as aluminum chloride, aluminum bromide, aluminum nitrate, and aluminum acetate. In order to prevent aggregation of primary particles, preferably, a trivalent metal salt containing a monovalent anion is used. A combination of two or more trivalent metal salts can also be used. Preferably, aluminum chloride is used.

In general, the precipitation pH of a trivalent metal ion as a hydroxide is lower than the precipitation pH of a divalent metal. For this reason, even if the pH during the reaction is kept constant by using a pH regulator, the trivalent ion is precipitated as a hydroxide first. The difference in precipitation pH between the divalent metal and the trivalent metal causes crystal strain, which results in aggregation of hydrotalcite primary particles.

Therefore, the precipitation pH of the trivalent metal ion as a hydroxide is increased to a value closer to the precipitation pH of the divalent metal by using the monovalent organic acid and/or organic acid salt as a complexing agent and causing the complexing agent and the trivalent metal to form a complex together, and thus, a hydrotalcite with less crystal strain can be obtained. Due to the steric hindrance effect of molecules of the complexing agent, the complexing agent also has an effect of suppressing crystal growth of primary particles of the hydrotalcite. Examples of the monovalent organic acid and/or organic acid salt that form a complex with the trivalent metal include, but are not limited to, lactic acid, sodium lactate, formic acid, sodium formate, acetic acid, sodium acetate, propionic acid, and sodium propionate. A combination of two or more organic acids and organic acid salts can also be used. Preferably, lactic acid, sodium lactate, acetic acid, and sodium acetate are used. Examples of the alkali metal hydroxide salt include, but are not limited to, sodium hydroxide and potassium hydroxide.

The divalent metal salt, the trivalent metal salt, and the monovalent organic acid and/or organic acid salt that forms a complex with the trivalent metal are dissolved in an aqueous solvent to prepare an aqueous solution of a water-soluble composite metal salt. The concentration of the divalent metal in the aqueous solution of the water-soluble composite metal salt is 0.01 to 2 mol/L, and preferably 0.1 to 1.5 mol/L. The concentration of the trivalent metal is 0.01 to 2 mol/L, and preferably 0.1 to 1.5 mol/L. The concentration of the alkali metal hydroxide is 0.01 to 4 mol/L, and preferably 0.1 to 2 mol/L. The ratio of the divalent metal to the trivalent metal is $1.78 \leq M^{2+}/M^{3+} \leq 4.88$, and preferably $1.94 \leq M^{2+}/M^{3+} \leq 4.26$. The amount added of the monovalent organic acid and/or organic acid salt that forms a complex with the trivalent metal is 0.1 to 2.2 eq., and more preferably 0.3 to 2 eq., with respect to the trivalent metal. An amount of less than 0.1 eq. causes primary particles of the hydrotalcite to be 200 nm or larger and therefore is not preferable. An amount of more than 2.2 eq. causes a negative ion derived from the complexing agent to be present between the layers of the hydrotalcite, resulting in gelation of the suspension due to a swelling effect, and therefore is not preferable.

(Reaction Step)

The hydrotalcite of the present invention can be prepared through a continuous reaction. Compared with a batch reaction, the ion concentration and the pH in the solution can be kept uniform. Therefore, a hydrotalcite with less lattice strain can be produced, and the production efficiency is better than that of a batch reaction.

During the reaction, the concentration in terms of the hydrotalcite is 0.1 to 300 g/L, preferably 0.5 to 250 g/L, and more preferably 1 to 200 g/L. During the reaction, a concentration of less than 0.1 g/L leads to low productivity and therefore is not preferable, and a concentration of more than 300 g/L causes aggregation of primary particles and therefore is not preferable. During the reaction, the temperature is 0 to 60° C., preferably 10 to 50° C., and more preferably 20 to 40° C. During the reaction, a temperature of less than 0° C. causes the suspension to freeze and therefore is not preferable, and a temperature of more than 60° C. causes primary particles to be 200 nm or larger and therefore is not preferable. During the reaction, the pH is 8.5 to 11.5, preferably 8.8 to 11.0, and more preferably 9.1 to 10.5. During the reaction, a pH of less than 8.5 causes the lattice strain in the hydrotalcite to increase and the degree of monodispersity to decrease and therefore is not preferable, and a pH of more than 11.5 causes primary particles of the hydrotalcite after aging to be 200 nm or larger and therefore is not preferable.

(Washing Step)

The suspension containing the hydrotalcite prepared in the reaction step is dehydrated, then washing with an amount of deionized water that is 20 to 30 times the hydrotalcite in weight is performed, and resuspending in water and/or an organic solvent is performed. By performing this step, salts such as sodium can be removed, and thus, aggregation of primary particles during the aging step can be prevented.

In the washing step, ion exchange with any anion can be performed after dehydration and prior to washing with water. There are two methods for performing the ion exchange. The first method is a method in which, after the suspension containing the post-reaction hydrotalcite is dehydrated to obtain a cake, the cake is dispersed in water and/or alcohol, and an anion-containing aqueous solution is added thereto, followed by stirring and retaining. At this time, the equivalent of the anion is 1 to 5 eq, and more preferably 1.5 to 3 eq, with respect to the hydrotalcite. The stirring and retaining temperature is preferably 30 to 90° C., and more preferably 50 to 80° C. The concentration of the hydrotalcite in terms of the hydrotalcite is preferably 0.1 to 300 g/L, more preferably 0.5 to 250 g/L, and even more preferably 1 to 200 g/L.

The second ion exchange method is a method in which, after the suspension containing the post-reaction hydrotalcite is dehydrated to obtain a cake, an anion-containing aqueous solution is directly added to the cake. At this time, the amount of the anion that is added is 1 to 5 eq, and preferably 1.5 to 3 eq, with respect to the hydrotalcite.

(Aging Step)

The suspension containing the hydrotalcite prepared in the washing step is stirred and retained at 0 to 100° C. for 1 to 60 hours. By performing this step, aggregation of primary particles can be alleviated, and a suspension in which primary particles are sufficiently dispersed can be obtained. An aging time of less than 1 hour is an insufficient length of time to alleviate the aggregation of primary particles. Even when aging is performed longer than 60 hours, the aggregation state remains unchanged, and therefore this is meaningless. The aging time is preferably 2 to 30 hours, and more preferably 4 to 24 hours. An aging temperature of more than 100° C. causes primary particles to be larger than 200 nm and therefore is not preferable. An aging temperature of less than 0° C. causes the suspension to freeze and therefore is not preferable. The aging temperature is preferably 20 to 90° C., and more preferably 40 to 80° C. During the aging, the concentration in terms of the hydrotalcite is 0.1 to 300 g/L, more preferably 0.5 to 250 g/L, and even more preferably 1 to 200 g/L. During the aging, a concentration of less than 0.1 g/L leads to low productivity and therefore is not preferable, and a concentration of more than 300 g/L causes aggregation of primary particles and therefore is not preferable (Surface Treatment Step)

After the aging step, the hydrotalcite particles are surface-treated, and thus, aggregation of primary particles in the suspension, and in a resin when added, kneaded, or dispersed in the resin, can be prevented. A wet method or a dry method can be used for the surface treatment. When uniformity of the treatment is taken into account, a wet method is favorably used. The temperature of the suspension after the aging step is adjusted, and a dissolved surface treatment agent is added thereto under stirring. During the surface treatment, the temperature is appropriately adjusted to a temperature at which the surface treatment agent dissolves.

For example, at least one selected from an anionic surfactant, a cationic surfactant, a phosphate ester-based treatment agent, a silane coupling agent, a titanate coupling agent, an aluminum coupling agent, a silicone-based treatment agent, sodium silicate, and the like can be used as the surface treatment agent. The surface treatment agent is particularly preferably at least one selected from the group consisting of oleic acid, stearic acid, octanoic acid, and octylic acid. The amount of the surface treatment agent is preferably 0.01 to 20 wt %, and more preferably 0.1 to 15 wt %, with respect to the weight of the hydrotalcite.

(Suspending and Drying Step)

After the surface treatment, the suspension is dehydrated, followed by washing with an amount of deionized water that is 20 to 30 times the solid content in weight.

In the case where the hydrotalcite is to be made into a suspension, the hydrotalcite after the washing with water is suspended in water and/or an organic solvent. The concentration of the hydrotalcite is 0.1 to 300 g/L, preferably 0.5 to 250 g/L, and more preferably 1 to 200 g/L. There is no particular limitation on the method for suspending the hydrotalcite, and any method that enables the particles to be uniformly suspended in the solvent can be used. Examples of the organic solvent include, but are not limited to, benzene, toluene, xylene, normal hexane, isohexane, normal heptane, cyclohexane, methylcyclohexane, ethylcyclohexane, methanol, ethanol, normal propyl alcohol, isopropyl alcohol, normal butanol, isobutanol, octanol, monoethylene glycol, diethylene glycol, triethylene glycol, propylene glycol, ethyl acetate, butyl acetate, isobutyl acetate, amyl acetate, methyl acetate, propylene glycol monomethyl ether acetate, methyl ethyl ketone, acetone, methyl isobutyl ketone, diisobutyl ketone, cyclohexanone, isophorone, diacetone alcohol, ethylene glycol monomethyl ether, ethylene glycol monoethyl ether, ethylene glycol monobutyl ether, diethylene glycol monoethyl ether, diethylene glycol monobutyl ether, diethylene glycol monomethyl ether, propylene glycol monomethyl ether, isopropyl ether, dichloromethane, trichloroethylene, perchloroethylene, tetrahydrofuran, N,N-dimethylformamide, dimethyl sulfoxide, N-methyl-2-pyrrolidone, gamma-butyrolactone, dioctyl phthalate, diisononyl phthalate, diisodecyl phthalate, dibutyl phthalate, dioctyl adipate, diisononyl adipate, trioctyl trimellitate, tricresyl phosphate, acetyl tributyl citrate, epoxidized soybean oil, epoxidized linseed oil, a sebacic acid ester, an azelaic acid ester, a maleic acid ester, a benzoic acid ester, and the like.

In the case where the hydrotalcite is to be made into a powder form, the hydrotalcite after the washing with water is dried to obtain a hydrotalcite of the present invention. Although hot-air drying, vacuum drying, or the like can be used as the drying method, the drying method is not limited to a specific method. Preferably, vacuum drying is used in order to prevent aggregation of primary particles intermediated by water.

In the case where the range of m of the hydrotalcite of the present invention is to be set to be $0 \leq m \leq 0.05$, it is preferable that, the drying temperature is 120 to 350° C., and the retaining time is 1 to 24 hours. With this treatment, water of crystallization can be removed from the hydrotalcite, and the range of m can be set to be $0 \leq m \leq 0.05$. The drying temperature is preferably 130 to 340° C., and more preferably 140 to 330° C. The drying time is preferably 1.5 to 22 hours, and more preferably 2 to 20 hours.

Hereinafter, the present invention will be described in detail using examples. However, the present invention is not limited only to these examples. In the examples below, various properties were measured using the following methods.

(A) Crystal Strain in the <003> Direction

Based on the following relation, $(\sin \theta/\lambda)$ is plotted on the horizontal axis and $(\beta \cos \theta/\lambda)$ on the vertical axis, and then, the crystal grain diameter (g) is obtained from the reciprocal of the intercept, and the crystal strain ($\eta$) is obtained by multiplying the gradient by ($\frac{1}{2}$).

$$(\beta \cos \theta/\lambda) = (1/g) + 2\eta \times (\sin \theta/\lambda)$$

where $\lambda$ indicates the wavelength of an X ray that is used, and is 1.542 Å when a Cu-K$\alpha$ ray is used; $\theta$ indicates the Bragg angle; and $\beta$ indicates the true half-width (unit: radian).

The above-described $\beta$ is obtained using the following method.

An X-ray diffractometer (Empyrean manufactured by PANalytical) is used, and diffraction profiles of the (003) plane and the (006) plane are measured using, as an X-ray source, a Cu-K$\alpha$ ray that is generated under conditions of 45 KV and 40 mA. With respect to the measurement conditions, the measurement is performed under conditions at a goniometer speed of 10°/min with slit widths of 1°-0.3 mm-1° for the (003) plane and 2°-0.3 mm-2° for the (006) plane in the order of the divergence slit, the receiving slit, and the scattering slit. In the obtained profiles, the width ($B_0$) at ($\frac{1}{2}$) of the height from the background to a diffraction peak is measured. From the relationship of the split width ($\delta$) between $K_{\alpha 1}$ and $K_{\alpha 2}$ against $2\theta$, $\delta$ against $2\theta$ of each of the (003) plane and the (006) plane is read. Next, based on the values of $B_0$ and $\delta$ described above, B is obtained from the relationship between ($\delta/B_0$) and ($B/B_0$). Subsequently, with respect to high-purity silicon (purity: 99.999%), diffraction profiles are measured with slit widths of ($\frac{1}{2}$)°-0.3 mm-($\frac{1}{2}$)°, and the half-width (b) is obtained. This is plotted against $2\theta$, and a graph showing the relationship between b and $2\theta$ is created. (b/$\beta$) is obtained from b corresponding to $2\theta$ of each of the (003) plane and the (006) plane. β is obtained from the relationship between (b/B) and (β/B).

(b) Average Width of Primary Particles

A sample was added to ethanol, and ultrasonic treatment was performed for 5 minutes. After that, the width of primary particles in any 100 crystals were measured using a scanning electron microscope (SEM) (JSM-7600F manufactured by JEOL Ltd.), and the arithmetic mean of the measured values was used as the average width of primary particles.

(c) Average Width of Secondary Particles

A sample was added to ethanol, and ultrasonic treatment was performed for 5 minutes. After that, the particle size distribution was measured using a particle size measuring apparatus based on a dynamic light scattering method (ELSZ-2 manufactured by Otsuka Electronics Co., Ltd.), and the number average diameter was used as the average width of secondary particles.

(d) Degree of Monodispersity

The degree of monodispersity was calculated from the values of (b) and (c) based on the following equation:

Degree of monodispersity (%)=(average width of primary particles as measured using SEM method/average width of secondary particles as measured using dynamic light scattering method)×100.

(e) BET Specific Surface Area

The specific surface area of a sample after drying was measured based on a gas adsorption method, using a specific surface area measuring apparatus (NOVA 2000 manufactured by Yuasa Ionics Co., Ltd.).

(f) Quantitative Determination of Chemical Composition

A sample was heated and dissolved in nitric acid. After that, the amounts of Mg, Zn, and Al were determined through chelatometric titration, and the amount of Cl was determined through Volhard titration. The amount of $CO_3$ was determined based on JIS. R. 9101, using an AGK type $CO_2$ simple precision quantitative analysis apparatus. The amount of interlayer water was calculated from a reduction in weight using TG-DTA.

(g) Quantitative Determination of Surface Treatment Amount

The oleic acid or stearic acid treatment amount of a sample was determined using an ether extraction method.

(h) Thermal Stability Test in Vinyl Chloride Resin

A sample was added to a polyvinyl chloride resin in the following blending ratio, and thermal stability was evaluated.

Polyvinyl chloride (with a polymerization degree of 1,300): 100 parts
  DOP: 50 parts
  Sample: 1.6 parts
  Zinc stearate: 0.4 parts The above-described blend was kneaded at 170° C. for 5 minutes using an 8-inch roller to prepare a test roll sheet having a thickness of 0.7 mm. A test piece that was 4 cm in length and width was taken from the obtained roll sheet, placed on a stainless steel plate, and subjected to a thermal stability test in a Geer oven at a degree of opening of 60% and 190° C. The thermal stability was evaluated based on the time (minutes) that had elapsed before the test piece was blackened or a black spot occurred thereon. The longer it took for a black spot to occur, the better the thermal stability.

(i) Transparency Test in Vinyl Chloride Resin

The roll sheet prepared in (h) was cut into pieces that were 4 cm in length and width. Three of the cut pieces were laid one on top of another, placed in a frame having a thickness of 2 mm, held between upper and lower stainless steel plates, and pressed in a press machine at 200° C. for 10 minutes at 100 MPa. Thus, a test piece was prepared. The haze (degree of cloudiness) in the prepared test piece was measured based on JIS. K. 7136 by using a haze meter (automatic haze meter TC-H3DP manufactured by Tokyo Denshoku Co., Ltd.), and the transparency was evaluated. The lower the haze, the better the transparency.

(j) Suspension Stability Test

A hydrotalcite after being surface-treated and washed with water was added to 1 L of isopropyl alcohol in an amount of 10 g in terms of the solid content, and then stirred using a homogenizer at 6,000 rpm for 20 minutes, and thus, a suspension was prepared. The suspension was transferred to a 1-L settling tube and allowed to stand for 10 days in this state. Sampling was performed immediately after, and one day and 10 days after the suspension was prepared, and the average width of secondary particles and the sedimentation state in each of the samples were evaluated. With respect to the average width of secondary particles, after the suspension was subjected to ultrasonic treatment for 5 minutes, the particle size distribution thereof was measured using a particle size measuring apparatus based on a dynamic light scattering method (ELSZ-2 manufactured by Otsuka Electronics Co., Ltd.), and the number average diameter was used as the average width of secondary particles. Also, the sedimentation state after one day and 10 days was visually checked, and a case where a water layer and a particle-containing layer were completely separated was evaluated as poor, whereas a case where the separation of layers was not confirmed was evaluated as good.

Example 1

(Raw Material Preparation Step)

Magnesium chloride hexahydrate (Wako Pure Chemical Industries, Ltd.) and aluminum chloride hexahydrate (Wako Pure Chemical Industries, Ltd.) were dissolved in deionized water to obtain an aqueous solution containing magnesium in a concentration of 0.2 mol/L and aluminum in a concentration of 0.1 mol/L. To this aqueous solution, sodium lactate (Kishida Chemical Co., Ltd.) was added in an amount of 1.75 eq. with respect to aluminum to obtain an aqueous solution of a water-soluble composite metal salt. On the other hand, sodium hydroxide (Wako Pure Chemical Industries, Ltd.) was dissolved in deionized water in a concentration of 0.8 mol/L to obtain an aqueous solution of an alkali metal hydroxide.

(Reaction Step)

The aqueous solution of the water-soluble composite metal salt and the aqueous solution of the alkali metal hydroxide were dispensed, at respective flow rates of 120 mL/min and 95 mL/min, into a cylindrical reaction vessel having an overflow capacity of 215 mL, and a reaction was conducted in a continuous manner. The suspension that overflowed from the reaction vessel was collected, and the flow rate of the aqueous solution of the alkali metal hydroxide was adjusted so that the pH was 9.3 to 9.6. Note that, during the reaction, the temperatures of the raw materials and the reaction vessel were adjusted so that the reaction temperature was 25° C. Moreover, during the reaction, stirring was performed using a screw propeller having a diameter of 2.5 cm at a rotation speed of 1,000 rpm.

(Washing Step)

The suspension was dehydrated through suction filtering by using a circular Nutsche and a suction filtration bottle to obtain a cake. Next, an aqueous solution of sodium carbonate was dispensed onto the cake in an amount of 1.5 eq. with respect to aluminum of the hydrotalcite contained in the cake, and ion exchange was performed. Then, the cake after the ion exchange was washed with an amount of deionized water that was 30 times the hydrotalcite in mass in order to remove by-products, such as salts, and impurities, such as residual sodium carbonate.

(Aging Step)

The cake after the washing with water was resuspended in deionized water. The cake was resuspended using a homomixer at a rotation rate of 4,000 rpm for 20 minutes. Deionized water was dispensed into the resuspended suspension to adjust the concentration to 50 g/L. After the concentration was adjusted, the suspension was kept at 60° C. in a constant temperature bath and subjected to aging treatment for 24 hours.

(Surface Treatment Step)

A 1 mol/L aqueous solution of sodium hydroxide (manufactured by Wako Pure Chemical Industries, Ltd.) was added to oleic acid (manufactured by Wako Pure Chemical Industries, Ltd.) in an amount of 1 eq. with respect to the oleic acid to obtain an aqueous solution of sodium oleate. The concentration of the aqueous solution of sodium oleate was adjusted using deionized water so that the oleic acid concentration was 5 g/L.

The concentration of the suspension after the aging treatment was adjusted to 10 g/L. After that, the temperature of the suspension was adjusted to 60° C. using a constant temperature bath, and the aqueous solution of sodium oleate was dispensed thereto in an amount of 10 wt %. After the aqueous solution of sodium oleate was dispensed, the suspension was stirred and retained at 60° C. for 30 minutes.

(Drying Step)

After the surface treatment, the suspension was cooled to room temperature, and then dehydrated by using a circular Nutsche and a suction filtration bottle to obtain a cake. In order to remove impurities, such as residual salts, contained in the cake after the surface treatment, the cake was washed with an amount of deionized water that was 20 times the amount of reaction product in terms of the solid content.

The cake after the washing with water was put into a stainless steel vat, and allowed to stand one night in a vacuum dryer at 40° C. while the degree of vacuum was kept at 30 cm Hg using a vacuum pump. Thus, a sample 1 was obtained. Table 1 shows experimental conditions of Example 1, and Table 2 shows the chemical composition, the crystal strain in the <003> direction, the average width of primary particles, the average width of secondary particles, the degree of monodispersity, the BET specific surface area, and the surface treatment amount.

Example 2

In the raw material preparation step of Example 1, magnesium chloride hexahydrate (Wako Pure Chemical Industries, Ltd.) and aluminum chloride hexahydrate (Wako Pure Chemical Industries, Ltd.), as well as zinc chloride (Wako Pure Chemical Industries, Ltd.) were dissolved in deionized water to obtain an aqueous solution containing magnesium in a concentration of 0.15 mol/L, zinc in a concentration of 0.05 mol/L, and aluminum in a concentration of 0.1 mol/L. To this aqueous solution, sodium lactate (Kishida Chemical Co., Ltd.) was added in an amount of 1.75 eq. with respect to aluminum to obtain an aqueous solution of a water-soluble composite metal salt. On the other hand, sodium hydroxide (Wako Pure Chemical Industries, Ltd.) was dissolved in deionized water in a concentration of 0.8 mol/L to obtain an aqueous solution of an alkali metal hydroxide. The subsequent steps were performed in a similar manner to prepare a sample, and thus, a sample 2 was obtained. Table 1 shows experimental conditions of Example 2, and Table 2 shows the chemical composition, the crystal strain in the <003> direction, the average width of primary particles, the average width of secondary particles, the degree of monodispersity, the BET specific surface area, and the surface treatment amount.

Example 3

A sample was prepared in a manner similar to that of Example 1, except that in the raw material preparation step, the concentrations of the raw materials were adjusted so that the concentration of magnesium was 0.3 mol/L, and the concentration of aluminum was 0.1 mol/L. Thus, a sample 3 was obtained. Table 1 shows experimental conditions of Example 3, and Table 2 shows the chemical composition, the crystal strain in the <003> direction, the average width of primary particles, the average width of secondary particles, the degree of monodispersity, the BET specific surface area, and the surface treatment amount.

Example 4

A sample was prepared in a manner similar to that of Example 1, except that in the raw material preparation step, the concentrations of the raw materials were adjusted so that the concentration of magnesium was 1 mol/L, the concentration of aluminum was 0.5 mol/L, and the concentration of sodium hydroxide was 4.0 mol/L. Thus, a sample 4 was obtained. Table 1 shows experimental conditions of Example 4, and Table 2 shows the chemical composition, the crystal strain in the <003> direction, the average width of primary particles, the average width of secondary particles, the degree of monodispersity, the BET specific surface area, and the surface treatment amount. FIG. 3 shows a SEM micrograph at a magnification of 10,000 of the sample 4, and FIG. 4 shows a SEM micrograph at a magnification of 100,000 thereof.

Example 5

A sample was prepared in a manner similar to that of Example 1, except that in the raw material preparation step, sodium lactate (manufactured by Kishida Chemical Co., Ltd.) was added in an amount of 0.5 eq. with respect to aluminum. Thus, a sample 5 was obtained. Table 1 shows experimental conditions of Example 5, and Table 2 shows the chemical composition, the crystal strain in the <003> direction, the average width of primary particles, the average width of secondary particles, the degree of monodispersity, the BET specific surface area, and the surface treatment amount.

Example 6

A sample was prepared in a manner similar to that of Example 1, except that in the reaction step, the flow rate of the aqueous solution of the alkali metal hydroxide was adjusted so that the reaction pH was 10.5 to 10.8. Thus, a sample 6 was obtained. Table 1 shows experimental conditions of Example 6, and Table 2 shows the chemical composition, the crystal strain in the <003> direction, the average width of primary particles, the average width of secondary particles, the degree of monodispersity, the BET specific surface area, and the surface treatment amount.

Example 7

A sample was prepared in a manner similar to that of Example 1, except that in the aging step, the aging temperature was set to be 90° C. Thus, a sample 7 was obtained. Table 1 shows experimental conditions of Example 7, and Table 2 shows the chemical composition, the crystal strain in the <003> direction, the average width of primary particles, the average width of secondary particles, the degree of monodispersity, the BET specific surface area, and the surface treatment amount.

Example 8

A sample was prepared in a manner similar to that of Example 1, except that in the reaction step, the reaction temperature was set to be 45° C. Thus, a sample 8 was obtained. Table 1 shows experimental conditions of Example 8, and Table 2 shows the chemical composition, the crystal strain in the <003> direction, the average width of primary particles, the average width of secondary particles, the degree of monodispersity, the BET specific surface area, and the surface treatment amount.

Example 9

A sample was prepared in a manner similar to that of Example 1, except that in the reaction step, the reaction temperature was set to be 45° C., and in the aging step, the aging temperature was set to be 90° C. Thus, a sample 9 was obtained. Table 1 shows experimental conditions of Example 9, and Table 2 shows the chemical composition, the crystal strain in the <003> direction, the average width of primary particles, the average width of secondary particles, the degree of monodispersity, the BET specific surface area, and the surface treatment amount.

Example 10

A sample was prepared in a manner similar to that of Example 1, except that in the washing step, an aqueous solution of sodium perchlorate was dispensed onto the cake in an amount of 1.5 eq. with respect to aluminum of the hydrotalcite contained in the cake, and ion exchange was performed. Thus, a sample 10 was obtained. Table 1 shows experimental conditions of Example 10, and Table 2 shows the chemical composition, the crystal strain in the <003> direction, the average width of primary particles, the average width of secondary particles, the degree of monodispersity, the BET specific surface area, and the surface treatment amount.

Example 11

A sample was prepared in a manner similar to that of Example 1, except that in the aging step, the aging time was set to be 1.5 hours. Thus, a sample 11 was obtained. Table 1 shows experimental conditions of Example 11, and Table 2 shows the chemical composition, the crystal strain in the <003> direction, the average width of primary particles, the average width of secondary particles, the degree of monodispersity, the BET specific surface area, and the surface treatment amount.

Example 12

In the surface treatment step of Example 1, while the temperature was adjusted to 80° C., a 1 mol/L aqueous solution of sodium hydroxide (manufactured by Wako Pure Chemical Industries, Ltd.) was added to stearic acid (manufactured by Wako Pure Chemical Industries, Ltd.) in an amount of 1 eq. with respect to the stearic acid to obtain an aqueous solution of sodium stearate. The concentration of the aqueous solution of sodium stearate was adjusted by using deionized water whose temperature was adjusted to 80° C. so that the stearic acid concentration was 5 g/L.

The concentration of the suspension after the aging treatment was adjusted to 10 g/L. After that, the temperature of the suspension was adjusted to 80° C. using a constant temperature bath. The aqueous solution of sodium stearate was dispensed into the suspension in an amount, in terms of stearic acid, of 10 wt % with respect to the hydrotalcite at a flow rate of 3 mL/L under stirring with use of a JET AJITER. After the aqueous solution of sodium stearate was added, the suspension was stirred and retained at 80° C. for 30 minutes. The other steps were performed in a similar manner, and thus, a sample 12 was obtained. Table 1 shows experimental conditions of Example 12, and Table 2 shows the chemical composition, the crystal strain in the <003> direction, the average width of primary particles, the average width of secondary particles, the degree of monodispersity, the BET specific surface area, and the surface treatment amount.

Example 13

The sample 1 of Example 1 was placed in a hot-air dryer and dried at 200° C. for 12 hours to obtain a sample 13. Table 1 shows experimental conditions of Example 13, and Table 2 shows the chemical composition, the crystal strain in the <003> direction, the average width of primary particles, the average width of secondary particles, the degree of monodispersity, the BET specific surface area, and the surface treatment amount.

Comparative Example 1

A sample was prepared in a manner similar to that of Example 1, except that in the raw material preparation step, sodium lactate was not added. Thus, a sample 14 was obtained. Table 1 shows experimental conditions of Comparative Example 1, and Table 2 shows the chemical composition, the crystal strain in the <003> direction, the average width of primary particles, the average width of secondary particles, the degree of monodispersity, the BET specific surface area, and the surface treatment amount.

Comparative Example 2

A sample was prepared in a manner similar to that of Example 1, except that in the reaction step, the reaction temperature was set to be 75° C. Thus, a sample 15 was obtained. Table 1 shows experimental conditions of Comparative Example 2, and Table 2 shows the chemical composition, the crystal strain in the <003> direction, the average width of primary particles, the average width of secondary particles, the degree of monodispersity, the BET specific surface area, and the surface treatment amount. FIG. 5 shows a SEM micrograph at a magnification of 10,000 of the sample 15, and FIG. 6 shows a SEM micrograph at a magnification of 100,000 thereof.

Comparative Example 3

A sample was prepared in a manner similar to that of Example 1, except that in the reaction step, the reaction pH was set to be 8.0 to 8.3. Thus, a sample 16 was obtained. Table 1 shows experimental conditions of Comparative Example 3, and Table 2 shows the chemical composition, the crystal strain in the <003> direction, the average width of primary particles, the average width of secondary particles, the degree of monodispersity, the BET specific surface area, and the surface treatment amount.

Comparative Example 4

A sample was prepared in a manner similar to that of Example 1, except that in the reaction step, the reaction pH was set to be 11.7 to 12.0. Thus, a sample 17 was obtained. Table 1 shows experimental conditions of Comparative Example 4, and Table 2 shows the chemical composition, the crystal strain in the <003> direction, the average width of primary particles, the average width of secondary particles, the degree of monodispersity, the BET specific surface area, and the surface treatment amount.

Comparative Example 5

A sample was prepared in a manner similar to that of Example 1, except that in the aging step, aging was performed at 120° C. for 24 hours using an autoclave. Thus, a sample 18 was obtained. Table 1 shows experimental conditions of Comparative Example 5, and Table 2 shows the chemical composition, the crystal strain in the <003> direction, the average width of primary particles, the average width of secondary particles, the degree of monodispersity, the BET specific surface area, and the surface treatment amount.

Comparative Example 6

A sample was prepared in a manner similar to that of Example 1, except that in the aging step, aging was not performed. Thus, a sample 19 was obtained. Table 1 shows experimental conditions of Comparative Example 6, and Table 2 shows the chemical composition, the crystal strain in the <003> direction, the average width of primary particles, the average width of secondary particles, the degree of monodispersity, the BET specific surface area, and the surface treatment amount. FIG. 7 shows a SEM micrograph at a magnification of 10,000 of the sample 19, and FIG. 8 shows a SEM micrograph at a magnification of 100,000 thereof.

TABLE 1

| | | Ex. 1 | Ex. 2 | Ex. 3 | Ex. 4 | Ex. 5 | Ex. 6 |
|---|---|---|---|---|---|---|---|
| Divalent metal raw material | Substance name | Magnesium chloride | Magnesium chloride | Zinc chloride | Magnesium chloride | Magnesium chloride | ← | ← |
| | Concentration (mol/L) | 0.2 | 0.15 | 0.05 | 0.3 | 1.0 | 0.2 | ← |
| Trivalent metal raw material | Substance name | Aluminum chloride | ← | | Aluminum chloride | Aluminum chloride | ← | ← |
| | Concentration (mol/L) | 0.1 | ← | | ← | 0.5 | 0.1 | ← |
| Alkali raw material | Substance name | Sodium hydroxide | ← | ← | ← | Sodium hydroxide | ← | ← |
| | Concentration (mol/L) | 0.8 | ← | ← | ← | 4.0 | 0.8 | ← |
| Complexing agent | Substance name | Sodium lactate | ← | ← | ← | Sodium lactate | ← | ← |
| | Equivalent (with respect to Al) | 1.75 | ← | ← | ← | 1.75 | 0.5 | 1.75 |
| Reaction conditions | Reaction temperature (° C.) | 25 | ← | ← | ← | 25 | ← | ← |
| | Reaction pH | 9.3 to 9.6 | ← | ← | ← | 9.3 to 9.6 | ← | 10.5 to 10.8 |
| Ion exchange | | Sodium carbonate | ← | ← | ← | Sodium carbonate | ← | ← |
| Aging treatment | Retaining temperature (° C.) | 60 | ← | ← | ← | 60 | ← | ← |
| | Retaining time (hr) | 24 | ← | ← | ← | 24 | ← | ← |
| Surface treatment | Type | Oleic acid | ← | ← | ← | Oleic acid | ← | ← |
| | Amount added (wt %, with respect to hydrotalcite) | 10 | ← | ← | ← | 10 | ← | ← |
| Drying treatment | | Vacuum drying | ← | ← | ← | Vacuum drying | ← | ← |

| | | Ex. 7 | Ex. 8 | Ex. 9 | Ex. 10 | Ex. 11 | Ex. 12 | Ex. 13 |
|---|---|---|---|---|---|---|---|---|
| Divalent metal raw material | Substance name | Magnesium chloride | ← | ← | Magnesium chloride | ← | ← | Magnesium chloride |
| | Concentration (mol/L) | 0.2 | ← | ← | 0.2 | ← | ← | 0.2 |
| Trivalent metal raw material | Substance name | Aluminum chloride | ← | ← | Aluminum chloride | ← | ← | Aluminum chloride |

TABLE 1-continued

|  |  |  |  |  |  |  |  |  |
|---|---|---|---|---|---|---|---|---|
| material | Concentration (mol/L) | 0.1 | ← | ← | 0.1 | ← | ← | 0.1 |
| Alkali raw material | Substance name | Sodium hydroxide | ← | ← | Sodium hydroxide | ← | ← | Sodium hydroxide |
|  | Concentration (mol/L) | 0.8 | ← | ← | 0.8 | ← | ← | 0.8 |
| Complexing agent | Substance name | Sodium lactate | ← | ← | Sodium lactate | ← | ← | Sodium lactate |
|  | Equivalent (with respect to Al) | 1.75 | ← | ← | 1.75 | ← | ← | 1.75 |
| Reaction conditions | Reaction temperature (° C.) | 25 | 45 | ← | 25 | ← | ← | 25 |
|  | Reaction pH | 9.3 to 9.6 | ← | ← | 9.3 to 9.6 | ← | ← | 9.3 to 9.6 |
| Ion exchange |  | Sodium carbonate | ← | ← | Sodium perchlorate | Sodium carbonate | ← | Sodium carbonate |
| Aging treatment | Retaining temperature (° C.) | 90 | 60 | 90 | 60 | ← | ← | 60 |
|  | Retaining time (hr) | 24 | ← | ← | 24 | 1.5 | 24 | 24 |
| Surface treatment | Type | Oleic acid | ← | ← | Oleic acid | ← | Stearic acid | Oleic acid |
|  | Amount added (wt %, with respect to hydrotalcite) | 10 | ← | ← | 10 | ← | ← | 10 |
| Drying treatment |  | Vacuum drying | ← | ← | Vacuum drying | ← | ← | Vacuum drying +hot-air drying |

|  |  | Com. Ex. 1 | Com. Ex. 2 | Com. Ex. 3 | Com. Ex. 4 | Com. Ex. 5 | Com. Ex. 6 |
|---|---|---|---|---|---|---|---|
| Divalent metal raw material | Substance name | Magnesium chloride | ← | ← | Magnesium chloride | ← | ← |
|  | Concentration (mol/L) | 0.2 | ← | ← | 0.2 | ← | ← |
| Trivalent metal raw material | Substance name | Aluminum chloride | ← | ← | Aluminum chloride | ← | ← |
|  | Concentration (mol/L) | 0.1 | ← | ← | 0.1 | ← | ← |
| Alkali raw material | Substance name | Sodium hydroxide | ← | ← | Sodium hydroxide | ← | ← |
|  | Concentration (mol/L) | 0.8 | ← | ← | 0.8 | ← | ← |
| Complexing agent | Substance name |  | Sodium lactate | ← | Sodium lactate | ← | ← |
|  | Equivalent (with respect to Al) |  | 1.75 | ← | 1.75 | ← | ← |
| Reaction conditions | Reaction temperature (° C.) | 25 | 75 | 25 | 25 | ← | ← |
|  | Reaction pH | 9.3 to 9.6 | ← | 8.0 to 8.3 | 11.7 to 12.0 | 9.3 to 9.6 | ← |
| Ion exchange |  | Sodium carbonate | ← | ← | Sodium carbonate | ← | ← |
| Aging treatment | Retaining temperature (° C.) | 60 | ← | ← | 60 | 120 | ← |
|  | Retaining time (hr) | 24 | ← | ← | 24 | ← | ← |
| Surface treatment | Type | Oleic acid | ← | ← | Oleic acid | ← | ← |
|  | Amount added (wt %, with respect to hydrotalcite) | 10 | ← | ← | 10 | ← | ← |
| Drying treatment |  | Vacuum drying | ← | ← | Vacuum drying | ← | ← |

TABLE 2

|  | Ex. 1 | Ex. 2 | Ex. 3 | Ex. 4 | Ex. 5 |
|---|---|---|---|---|---|
| Sample No. | 1 | 2 | 3 | 4 | 5 |
| Chemical composition | $Mg_{0.67}Al_{0.33}(OH)_2$ $(CO_3)_{0.17} \cdot 7.8H_2O$ | $Mg_{0.5}Zn_{0.17}Al_{0.33}(OH)_2$ $(CO_3)_{0.17} \cdot 7.8H_2O$ | $Mg_{0.75}Al_{0.25}(OH)_2$ $(CO_3)_{0.13} \cdot 7.9H_2O$ | $Mg_{0.67}Al_{0.33}(OH)_2$ $(CO_3)_{0.17} \cdot 7.8H_2O$ | ← |

TABLE 2-continued

|  |  |  |  |  |  |  |
|---|---|---|---|---|---|---|
| Lattice strain in the <003> direction |  | $1.6 \times 10^{-3}$ | $2.3 \times 10^{-3}$ | $1.5 \times 10^{-3}$ | $1.3 \times 10^{-3}$ | $1.5 \times 10^{-3}$ |
| Primary particle | Average width (nm) | 38 | 48 | 53 | 54 | 68 |
| Secondary particle | Average width (nm) | 45 | 59 | 64 | 62 | 85 |
| Degree of monodispersity (%) |  | 84 | 81 | 83 | 87 | 80 |
| BET specific surface area (m²/g) |  | 78 | 68 | 83 | 61 | 56 |
| Surface Treatment treatment agent | Type | Oleic acid | ← | ← | Oleic acid | ← |
|  | Treatment amount (wt %, with respect to hydrotalcite) | 9.7 | 9.6 | 9.8 | 9.7 | 9.8 |

|  |  | Ex. 6 | Ex. 7 | Ex. 8 | Ex. 9 | Ex. 10 |
|---|---|---|---|---|---|---|
| Sample No. |  | 6 | 7 | 8 | 9 | 10 |
| Chemical composition |  | ← | $Mg_{0.67}Al_{0.33}(OH)_2$ $(CO_3)_{0.17} \cdot 7.8H_2O$ | ← | ← | $Mg_{0.67}Al_{0.33}(OH)_2$ $(ClO_4)_{0.33} \cdot 7.8H_2O$ |
| Lattice strain in the <003> direction |  | $2.3 \times 10^{-3}$ | $9.5 \times 10^{-4}$ | $1.2 \times 10^{-3}$ | $2.3 \times 10^{-3}$ | $2.2 \times 10^{-3}$ |
| Primary particle | Average width (nm) | 72 | 78 | 68 | 83 | 47 |
| Secondary particle | Average width (nm) | 94 | 89 | 81 | 104 | 58 |
| Degree of monodispersity (%) |  | 77 | 88 | 84 | 80 | 81 |
| BET specific surface area (m²/g) |  | 48 | 54 | 57 | 49 | 69 |
| Surface treatment agent | Type | ← | Oleic acid | ← | ← | Oleic acid |
|  | Treatment amount (wt %, with respect to hydrotalcite) | 9.8 | 9.7 | 9.8 | 9.7 | 9.8 |

|  |  | Ex. 11 | Ex. 12 | Ex. 13 | Com. Ex. 1 | Com. Ex. 2 |
|---|---|---|---|---|---|---|
| Sample No. |  | 11 | 12 | 13 | 14 | 15 |
| Chemical composition |  | $Mg_{0.67}Al_{0.33}(OH)_2$ $(CO_3)_{0.17} \cdot 7.8H_2O$ | ← | $Mg_{0.67}Al_{0.33}(OH)_2$ $(CO_3)_{0.17} \cdot 0.02H_2O$ | $Mg_{0.67}Al_{0.33}(OH)_2$ $(CO_3)_{0.17} \cdot 7.8H_2O$ | ← |
| Lattice strain in the <003> direction |  | $2.4 \times 10^{-3}$ | $1.5 \times 10^{-3}$ | $2.5 \times 10^{-3}$ | $9.5 \times 10^{-2}$ | $1.5 \times 10^{-3}$ |
| Primary particle | Average width (nm) | 43 | 48 | 51 | 54 | 203 |
| Secondary particle | Average width (nm) | 67 | 57 | 67 | 1024 | 251 |
| Degree of monodispersity (%) |  | 64 | 84 | 76 | 5 | 81 |
| BET specific surface area (m²/g) |  | 67 | 63 | 82 | 34 | 15 |
| Surface treatment agent | Type | ← | Stearic acid | Oleic acid | Oleic acid | ← |
|  | Treatment amount (wt %, with respect to hydrotalcite) | 9.6 | 9.8 | 9.8 | 9.6 | 9.9 |

|  |  | Com. Ex. 3 | Com. Ex. 4 | Com. Ex. 5 | Com. Ex. 6 |
|---|---|---|---|---|---|
| Sample No. |  | 16 | 17 | 18 | 19 |
| Chemical composition |  | ← | $Mg_{0.67}Al_{0.33}(OH)_2$ $(CO_3)_{0.17} \cdot 7.8H_2O$ | ← | ← |
| Lattice strain in the <003> direction |  | $2.1 \times 10^{-2}$ | $7.2 \times 10^{-3}$ | $2.3 \times 10^{-3}$ | $8.9 \times 10^{-2}$ |
| Primary particle | Average width (nm) | 52 | 172 | 313 | 48 |
| Secondary particle | Average width (nm) | 243 | 453 | 375 | 1464 |
| Degree of monodispersity (%) |  | 21 | 38 | 83 | 3 |
| BET specific surface area (m²/g) |  | 9 | 7 | 10 | 9 |
| Surface treatment agent | Type | ← | Oleic acid | ← | ← |
|  | Treatment amount (wt %, with respect to hydrotalcite) | 9.8 | 9.7 | 9.5 | 9.8 |

It can be seen from Tables 1 and 2 that in the hydrotalcites of Examples 1 to 13, the lattice strain in the <003> direction as measured using the X-ray diffraction method was $3 \times 10^{-3}$ or less, the average width of primary particles as measured using the SEM method was 200 nm or less, and the degree of monodispersity was 50% or greater. In contrast, in the hydrotalcites of Comparative Examples 1 to 6, primary particles were larger than 200 nm, or the degree of monodispersity was less than 50%.

Example 14

The sample 1 obtained in Example 1 was added to a polyvinyl chloride resin in the following blending ratio, and thermal stability and transparency were evaluated.
Polyvinyl chloride (with a polymerization degree of 1,300): 100 parts
DOP (dioctyl phthalate): 50 parts
Sample: 1.6 parts
Zinc stearate: 0.4 parts The above-described blend was kneaded at 170° C. for 5 minutes using an 8-inch roller to prepare a test roll sheet having a thickness of 0.7 mm. A test piece that was 4 cm in length and width was taken from the obtained roll sheet, placed on a stainless steel plate, and subjected to a thermal stability test in a Geer oven at a degree of opening of 60% and 190° C. The thermal stability was evaluated based on the time (minutes) that had elapsed before the test piece was blackened or a black spot occurred thereon.

The above-described roll sheet was cut into pieces that were 4 cm in length and width. Three of the cut pieces were laid one on top of another, placed in a frame having a thickness of 2 mm, held between upper and lower stainless steel plates, and pressed in a press machine at 200° C. for 10 minutes at 100 MPa. Thus, a test piece was prepared. The degree of cloudiness (haze) in the prepared test piece was measured based on JIS. K. 7136 by using a haze meter, and the transparency was evaluated. Table 3 shows the components of the blend, the result of the thermal stability test, and the result of the transparency test of Example 14.

Example 15

The sample 2 obtained in Example 2 was added to a polyvinyl chloride resin in a blending ratio similar to that of Example 13, and thermal stability and transparency were evaluated. Table 3 shows the components of the blend, the result of the thermal stability test, and the result of the transparency test of Example 15.

Example 16

The sample 3 obtained in Example 3 was added to a polyvinyl chloride resin in a blending ratio similar to that of Example 13, and thermal stability and transparency were evaluated. Table 3 shows the components of the blend, the result of the thermal stability test, and the result of the transparency test of Example 16.

Example 17

The sample 4 obtained in Example 4 was added to a polyvinyl chloride resin in a blending ratio similar to that of Example 13, and thermal stability and transparency were evaluated. Table 3 shows the components of the blend, the result of the thermal stability test, and the result of the transparency test of Example 17.

Example 18

The sample 5 obtained in Example 5 was added to a polyvinyl chloride resin in a blending ratio similar to that of Example 13, and thermal stability and transparency were evaluated. Table 3 shows the components of the blend, the result of the thermal stability test, and the result of the transparency test of Example 18.

Example 19

The sample 6 obtained in Example 6 was added to a polyvinyl chloride resin in a blending ratio similar to that of Example 13, and thermal stability and transparency were evaluated. Table 3 shows the components of the blend, the result of the thermal stability test, and the result of the transparency test of Example 19.

Example 20

The sample 7 obtained in Example 7 was added to a polyvinyl chloride resin in a blending ratio similar to that of Example 13, and thermal stability and transparency were evaluated. Table 3 shows the components of the blend, the result of the thermal stability test, and the result of the transparency test of Example 20.

Example 21

The sample 8 obtained in Example 8 was added to a polyvinyl chloride resin in a blending ratio similar to that of Example 13, and thermal stability and transparency were evaluated. Table 3 shows the components of the blend, the result of the thermal stability test, and the result of the transparency test of Example 21.

Example 22

The sample 9 obtained in Example 9 was added to a polyvinyl chloride resin in a blending ratio similar to that of Example 13, and thermal stability and transparency were evaluated. Table 3 shows the components of the blend, the result of the thermal stability test, and the result of the transparency test of Example 22.

Example 23

The sample 10 obtained in Example 10 was added to a polyvinyl chloride resin in a blending ratio similar to that of Example 13, and thermal stability and transparency were evaluated. Table 3 shows the components of the blend, the result of the thermal stability test, and the result of the transparency test of Example 23.

Example 24

The sample 11 obtained in Example 11 was added to a polyvinyl chloride resin in a blending ratio similar to that of Example 13, and thermal stability and transparency were evaluated. Table 3 shows the components of the blend, the result of the thermal stability test, and the result of the transparency test of Example 24.

Example 25

The sample 12 obtained in Example 12 was added to a polyvinyl chloride resin in a blending ratio similar to that of Example 13, and thermal stability and transparency were evaluated. Table 3 shows the components of the blend, the result of the thermal stability test, and the result of the transparency test of Example 25.

Example 26

The sample 13 obtained in Example 13 was added to a polyvinyl chloride resin in a blending ratio similar to that of Example 13, and thermal stability and transparency were evaluated. Table 3 shows the components of the blend, the result of the thermal stability test, and the result of the transparency test of Example 26.

Comparative Example 7

The sample 14 obtained in Comparative Example 1 was added to a polyvinyl chloride resin in a blending ratio similar to that of Example 13, and thermal stability and transparency were evaluated. Table 3 shows the components of the blend, the result of the thermal stability test, and the result of the transparency test of Comparative Example 7.

Comparative Example 8

The sample 15 obtained in Comparative Example 2 was added to a polyvinyl chloride resin in a blending ratio similar to that of Example 13, and thermal stability and transparency were evaluated. Table 3 shows the components of the blend, the result of the thermal stability test, and the result of the transparency test of Comparative Example 8.

Comparative Example 9

The sample 16 obtained in Comparative Example 3 was added to a polyvinyl chloride resin in a blending ratio similar to that of Example 13, and thermal stability and transparency were evaluated. Table 3 shows the components of the blend, the result of the thermal stability test, and the result of the transparency test of Comparative Example 9.

Comparative Example 10

The sample 17 obtained in Comparative Example 4 was added to a polyvinyl chloride resin in a blending ratio similar to that of Example 13, and thermal stability and transparency were evaluated. Table 3 shows the components of the blend, the result of the thermal stability test, and the result of the transparency test of Comparative Example 10.

Comparative Example 11

The sample 18 obtained in Comparative Example 5 was added to a polyvinyl chloride resin in a blending ratio similar to that of Example 13, and thermal stability and transparency were evaluated. Table 3 shows the components of the blend, the result of the thermal stability test, and the result of the transparency test of Comparative Example 11.

Comparative Example 12

The sample 19 obtained in Comparative Example 6 was added to a polyvinyl chloride resin in a blending ratio similar to that of Example 13, and thermal stability and transparency were evaluated. Table 3 shows the components of the blend, the result of the thermal stability test, and the result of the transparency test of Comparative Example 12.

TABLE 3

| | | Ex. 14 | Ex. 15 | Ex. 16 | Ex. 17 | Ex. 18 |
|---|---|---|---|---|---|---|
| Polyvinyl chloride (polymerization degree: 1,300) | Parts by weight | 100 | ← | ← | ← | ← |
| DOP | Parts by weight | 50 | ← | ← | ← | ← |
| Zinc stearate | Parts by weight | 0.4 | ← | ← | ← | ← |
| Sample 1 | Parts by weight | 1.6 | — | — | — | — |
| Sample 2 | Parts by weight | — | 1.6 | — | — | — |
| Sample 3 | Parts by weight | — | — | 1.6 | — | — |
| Sample 4 | Parts by weight | — | — | — | 1.6 | — |
| Sample 5 | Parts by weight | — | — | — | — | 1.6 |
| Thermal stability | (min) | 90 | 80 | 90 | 80 | 70 |
| Transparency | (Haze value) | 0.9 | 1.3 | 1.4 | 1.4 | 1.7 |

| | | Ex. 19 | Ex. 20 | Ex. 21 | Ex. 22 | Ex. 23 |
|---|---|---|---|---|---|---|
| Polyvinyl chloride (polymerization degree: 1,300) | Parts by weight | 100 | ← | ← | ← | ← |
| DOP | Parts by weight | 50 | ← | ← | ← | ← |
| Zinc stearate | Parts by weight | 0.4 | ← | ← | ← | ← |
| Sample 6 | Parts by weight | 1.6 | — | — | — | — |
| Sample 7 | Parts by weight | — | 1.6 | — | — | — |
| Sample 8 | Parts by weight | — | — | 1.6 | — | — |
| Sample 9 | Parts by weight | — | — | — | 1.6 | — |
| Sample 10 | Parts by weight | — | — | — | — | 1.6 |
| Thermal stability | (min) | 70 | 70 | 70 | 70 | 80 |
| Transparency | (Haze value) | 1.9 | 1.8 | 1.9 | 2.1 | 1.3 |

| | | Ex. 24 | Ex. 25 | Ex. 26 | Com. Ex. 7 | Com. Ex. 8 |
|---|---|---|---|---|---|---|
| Polyvinyl chloride (polymerization degree: 1,300) | Parts by weight | 100 | ← | ← | ← | ← |

TABLE 3-continued

| DOP | Parts by weight | 50 | ← | ← | ← | ← |
|---|---|---|---|---|---|---|
| Zinc stearate | Parts by weight | 0.4 | ← | ← | ← | ← |
| Sample 11 | Parts by weight | 1.6 | — | — | — | — |
| Sample 12 | Parts by weight | — | 1.6 | — | — | — |
| Sample 13 | Parts by weight | — | — | 1.6 | — | — |
| Sample 14 | Parts by weight | — | — | — | 1.6 | — |
| Sample 15 | Parts by weight | — | — | — | — | 1.6 |
| Thermal stability | (min) | 60 | 70 | 70 | 10 | 40 |
| Transparency | (Haze value) | 1.4 | 1.1 | 1.8 | 6.9 | 3.5 |

|  |  | Com. Ex. 9 | Com. Ex. 10 | Com. Ex. 11 | Com. Ex. 12 |
|---|---|---|---|---|---|
| Polyvinyl chloride (polymerization degree: 1,300) | Parts by weight | 100 | ← | ← | ← |
| DOP | Parts by weight | 50 | ← | ← | ← |
| Zinc stearate | Parts by weight | 0.4 | ← | ← | ← |
| Sample 16 | Parts by weight | 1.6 | — | — | — |
| Sample 17 | Parts by weight | — | 1.6 | — | — |
| Sample 18 | Parts by weight | — | — | 1.6 | — |
| Sample 19 | Parts by weight | — | — | — | 1.6 |
| Thermal stability | (min) | 20 | 20 | 40 | 10 |
| Transparency | (Haze value) | 4.2 | 5.9 | 4.9 | 8.3 |

It can be seen from Table 3 that the polyvinyl chloride resin compositions of Examples 14 to 26 had superior thermal stability and transparency compared with those of Comparative Examples 7 to 12.

Example 27

The hydrotalcite that was washed with water after the surface treatment in Example 1 was collected in an amount of 10 g in terms of the solid content, and added to 1 L of isopropyl alcohol. After that, stirring was performed using a homogenizer at 6,000 rpm for 20 minutes to prepare a suspension. The suspension was transferred to a 1-L settling tube and allowed to stand for 10 days in this state. Sampling was performed immediately after, and one day and 10 days after the suspension was prepared, and the average width of secondary particles and the sedimentation state were evaluated. Table 4 shows the evaluation results.

Example 28

The hydrotalcite that was washed with water after the surface treatment in Example 2 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 29

The hydrotalcite that was washed with water after the surface treatment in Example 3 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 30

The hydrotalcite that was washed with water after the surface treatment in Example 4 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 31

The hydrotalcite that was washed with water after the surface treatment in Example 5 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 32

The hydrotalcite that was washed with water after the surface treatment in Example 6 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 33

The hydrotalcite that was washed with water after the surface treatment in Example 7 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 34

The hydrotalcite that was washed with water after the surface treatment in Example 8 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 35

The hydrotalcite that was washed with water after the surface treatment in Example 9 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 36

The hydrotalcite that was washed with water after the surface treatment in Example 10 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 37

The hydrotalcite that was washed with water after the surface treatment in Example 11 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 38

The hydrotalcite that was washed with water after the surface treatment in Example 12 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Example 39

The hydrotalcite that was washed with water after the surface treatment in Example 13 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Comparative Example 13

The hydrotalcite that was washed with water after the surface treatment in Comparative Example 1 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Comparative Example 14

The hydrotalcite that was washed with water after the surface treatment in Comparative Example 2 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Comparative Example 15

The hydrotalcite that was washed with water after the surface treatment in Comparative Example 3 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Comparative Example 16

The hydrotalcite that was washed with water after the surface treatment in Comparative Example 4 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Comparative Example 17

The hydrotalcite that was washed with water after the surface treatment in Comparative Example 5 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

Comparative Example 18

The hydrotalcite that was washed with water after the surface treatment in Comparative Example 6 was treated in a manner similar to that of Example 27 to prepare a suspension. Sampling was performed immediately after, and one day and 10 days after the suspension was prepared, and the average width of secondary particles and the sedimentation state were evaluated. Table 4 shows the evaluation results.

TABLE 4

| | | | Ex. 27 | Ex. 28 | Ex. 29 | Ex. 30 | Ex. 31 |
|---|---|---|---|---|---|---|---|
| Average width of secondary particles | Immediately after | nm | 39 | 53 | 56 | 58 | 75 |
| | After 1 day | | 41 | 54 | 58 | 59 | 77 |
| | After 10 days | | 44 | 58 | 61 | 61 | 81 |
| Sedimentation state | After 1 day | | Good | Good | Good | Good | Good |
| | After 10 days | | Good | Good | Good | Good | Good |

TABLE 4-continued

|  |  |  | Ex. 32 | Ex. 33 | Ex. 34 | Ex. 35 | Ex. 36 |
|---|---|---|---|---|---|---|---|
| Average width of secondary particles | Immediately after | nm | 79 | 83 | 72 | 88 | 52 |
|  | After 1 day |  | 84 | 84 | 73 | 92 | 54 |
|  | After 10 days |  | 90 | 86 | 79 | 98 | 58 |
| Sedimentation state | After 1 day |  | Good | Good | Good | Good | Good |
|  | After 10 days |  | Good | Good | Good | Good | Good |

|  |  |  | Ex. 37 | Ex. 38 | Ex. 39 | Com. Ex. 13 | Com. Ex. 14 |
|---|---|---|---|---|---|---|---|
| Average width of secondary particles | Immediately after | nm | 49 | 53 | 58 | 89 | 211 |
|  | After 1 day |  | 54 | 54 | 60 | 321 | 219 |
|  | After 10 days |  | 64 | 55 | 62 | 529 | 243 |
| Sedimentation state | After 1 day |  | Good | Good | Good | Good | Poor |
|  | After 10 days |  | Good | Good | Good | Poor | Poor |

|  |  |  | Com. Ex. 15 | Com. Ex. 16 | Com. Ex. 17 | Com. Ex. 18 |
|---|---|---|---|---|---|---|
| Average width of secondary particles | Immediately after | nm | 74 | 213 | 324 | 143 |
|  | After 1 day |  | 84 | 250 | 343 | 321 |
|  | After 10 days |  | 214 | 398 | 365 | 927 |
| Sedimentation state | After 1 day |  | Good | Poor | Poor | Poor |
|  | After 10 days |  | Poor | Poor | Poor | Poor |

It can be seen from Table 4 that in the suspensions of Examples 27 to 39, the average width of secondary particles changed less over time than those of Comparative Examples 13 to 18, and particles did not settle as a sediment even after 10 days.

INDUSTRIAL APPLICABILITY

The hydrotalcite of the present invention can be used for various uses including a thermal stabilizer for a polyvinyl chloride resin, a neutralizing agent for a residue of a polyolefin polymerization catalyst, an acid acceptor for a halogen-containing rubber, a heat-insulating agent for an agricultural film, and the like. In particular, a suspension that contains the hydrotalcite can be favorably used as a liquid antacid or thermal stabilizer. The hydrotalcite of the present invention has a significantly improved anion-exchangeability compared with conventional hydrotalcites, and therefore exhibits superior effects as a stabilizer, a neutralizing agent, and an acid acceptor to a conventional hydrotalcite if added in the same amount, and can exhibit equivalent performance to that of a conventional hydrotalcite even if added in a smaller amount than the conventional hydrotalcite. Moreover, when the hydrotalcite of the present invention is added to a resin, higher transparency is obtained compared with when a conventional hydrotalcite is added in the same amount.

The invention claimed is:

1. A hydrotalcite represented by a formula (1) below:

$$(M^{2+})_{1-x}(M^{3+})_x(OH)_2(A^{n-})_{x/n} \cdot mH_2O \quad (1),$$

where $M^{2+}$ indicates at least one divalent metal, $M^{3+}$ indicates at least one trivalent metal, $A^{n-}$ indicates an n-valent anion, n indicates an integer of 1 to 6, and x and m are within respective ranges of $0.17 \leq x \leq 0.36$ and $0 \leq m \leq 10$, the hydrotalcite comprising primary and secondary particles, and the hydrotalcite satisfying (A) to (C) below:
(A) the lattice strain in the <003> direction as measured using an X-ray diffraction method is $3 \times 10^{-3}$ or less;
(B) the average width of primary particles as measured using a SEM method is between 5 nm and 200 nm inclusive; and
(C) the degree of monodispersity expressed by an equation below is 50% or greater:

degree of monodispersity (%)=(average width of primary particles as measured using the SEM method/average width of secondary particles as measured using a dynamic light scattering method)×100.

2. The hydrotalcite according to claim 1, wherein (A) the lattice strain in the <003> direction as measured using the X-ray diffraction method is $2.5 \times 10^{-3}$ or less.

3. The hydrotalcite according to claim 1, wherein (B) the average width of primary particles as measured using the SEM method is between 5 nm and 150 nm inclusive.

4. The hydrotalcite according to claim 1, wherein (C) the degree of monodispersity is 80% or greater.

5. The hydrotalcite according to claim 1, wherein, in the formula (1), $M^{2+}$ is at least one selected from the group consisting of Mg and Zn, and $M^{3+}$ is Al.

6. The hydrotalcite according to claim 1, wherein, in the formula (1), the range of m is $0 \leq m \leq 0.05$.

7. The hydrotalcite according to claim 1, wherein a BET specific surface area is 20 to 600 $m^2/g$.

8. The hydrotalcite according to claim 1, wherein a surface of the hydrotalcite is surface-treated with at least one selected from the group consisting of an anionic surfactant, a cationic surfactant, oleic acid, stearic acid, octanoic acid, octylic acid, silicic acid, and water glass.

9. A method for producing a the hydrotalcite of claim 1, the method comprising the following four steps:
(1) a raw material preparation step of preparing an aqueous solution of a water-soluble composite metal salt and an aqueous solution of an alkali metal hydroxide, the aqueous solution of the water-soluble composite metal salt containing a salt of a divalent metal, a salt of a trivalent metal, and a monovalent organic acid and/or organic acid salt that forms a complex with the trivalent metal;
(2) a reaction step of causing the aqueous solution of the water-soluble composite metal salt and the aqueous solution of the alkali metal hydroxide prepared in the step (1) to continuously react with each other at a reaction temperature of 0 to 60° C. and a reaction pH of 8.5 to 11.5 to thereby obtain a suspension containing a hydrotalcite;
(3) a washing step of dehydrating the suspension containing the hydrotalcite obtained in the step (2), and then performing washing with water and suspending in water and/or an organic solvent; and
(4) an aging step of stirring and retaining a suspension containing the washed hydrotalcite obtained in the step (3) at 0 to 100° C. for 1 to 60 hours.

10. The method for producing a hydrotalcite according to claim 9, wherein, in the raw material preparation step of claim 9, the monovalent organic acid and/or organic acid salt that forms a complex with the trivalent metal is at least one selected from the group consisting of lactic acid, sodium lactate, acetic acid, and sodium acetate.

11. A method for producing the hydrotalcite according to claim 6, wherein the hydrotalcite is obtained by drying the hydrotalcite according to claim 1 at 100° C. to 350° C. for 1 to 24 hours.

12. A resin composition containing the hydrotalcite according to claim 1 in an amount of 0.1 to 250 parts by weight with respect to 100 parts by weight of a resin.

13. The resin composition according to claim 12, wherein the resin is a halogen-containing resin.

14. A molded product formed of the resin composition according to claim 12.

15. A suspension in which a solvent is water and/or an organic solvent, and the hydrotalcite according to claim 1 is contained in a solid content concentration of 0.1 to 300 g/L.

* * * * *